(12) United States Patent
Adams

(10) Patent No.: US 12,134,286 B1
(45) Date of Patent: Nov. 5, 2024

(54) DEVICE FOR QUICKLY ATTACHING AND DETACHING EQUIPMENT

(71) Applicant: James Stephen Adams, Bridgewater, NJ (US)

(72) Inventor: James Stephen Adams, Bridgewater, NJ (US)

( * ) Notice: Subject to any disclaimer, the term of this patent is extended or adjusted under 35 U.S.C. 154(b) by 0 days.

(21) Appl. No.: 18/780,745

(22) Filed: Jul. 23, 2024

Related U.S. Application Data

(60) Provisional application No. 63/529,765, filed on Jul. 30, 2023.

(51) Int. Cl.
| | | |
|---|---|---|
| *B60D 1/145* | (2006.01) | |
| *B60D 1/00* | (2006.01) | |
| *B60D 1/01* | (2006.01) | |
| *B60D 1/52* | (2006.01) | |

(52) U.S. Cl.
CPC .............. *B60D 1/145* (2013.01); *B60D 1/01* (2013.01); *B60D 1/52* (2013.01); *B60D 2001/006* (2013.01)

(58) Field of Classification Search
CPC . B60D 1/52; B60D 1/01; B60D 1/145; B60D 2001/0006
See application file for complete search history.

(56) References Cited

U.S. PATENT DOCUMENTS

| | | | | |
|---|---|---|---|---|
| 7,540,521 | B2 * | 6/2009 | Ragusa .................... | B60D 1/00 |
| | | | | 280/415.1 |
| 8,382,138 | B2 * | 2/2013 | Carroll .................. | B62B 5/0079 |
| | | | | 280/288.4 |
| 9,067,610 | B2 * | 6/2015 | Lichtenberg ............. | B60D 1/07 |
| 9,789,741 | B1 | 10/2017 | Marling | |
| 2008/0231029 | A1 * | 9/2008 | Hummel ................... | B60R 9/06 |
| | | | | 224/510 |
| 2019/0071025 | A1 * | 3/2019 | Anton ....................... | B60R 9/10 |
| 2022/0185354 | A1 * | 6/2022 | LaPlante ................... | B62B 1/24 |
| 2022/0348048 | A1 * | 11/2022 | Bruno ...................... | B60D 1/54 |

FOREIGN PATENT DOCUMENTS

WO   WO-2022032330 A1 *   2/2022

* cited by examiner

*Primary Examiner* — Kevin Hurley
(74) *Attorney, Agent, or Firm* — Walter J. Tencza, Jr.

(57) ABSTRACT

An apparatus including first and second apparatuses for removably attaching a wheelbarrow to a power tow vehicle. The first apparatus includes a cradle clamp head assembly; a vertical body assembly having a first end and an opposing second end, the cradle clamp head assembly configured to be attached to the vertical body assembly closer to the first end than the second end of the vertical body assembly; and a hitch receiver adapter configured to be attached to the vertical body assembly, while the cradle clamp head assembly is attached to the vertical body assembly, such that the hitch receiver adapter is further from the first end of the vertical body assembly than the cradle clamp head assembly. The second apparatus includes a first bar having a first and second ends; and a first attachment device which attaches the first bar to a wheelbarrow.

18 Claims, 21 Drawing Sheets

DEVICE FOR QUICKLY ATTACHING AND DETACHING EQUIPMENT

CROSS REFERENCE TO RELATED APPLICATION(S)

The present application claims the priority of U.S. provisional patent application Ser. No. 63/529,765, filed on Jul. 30, 2023, inventor and applicant James Stephen Adams

FIELD OF THE INVENTION

This invention relates to devices for attaching and detaching equipment.

BACKGROUND OF THE INVENTION

In the landscape industry we rely on manual and machine powered equipment to do our jobs in an efficient cost effective manner.

Manual walk push/pull type equipment such as the wheelbarrow have proven to be more efficient and productive in small areas mostly due to their maneuverability and small size. However, after continuous use of manual equipment, user fatigue will always reduce their benefits and efficiency.

Machine powered equipment such as towable or mounted-on dump carts require no walking and are very productive in large open areas or when using over long distances. However, due to the machines bulky size, maneuvering is limited and in many areas their use is restricted. Furthermore, the attached equipment is either not meant to be removed to use independently or is too difficult and/or time consuming to convert to manual use, especially on a repeated use basis.

Both manual and machine powered equipment have their advantages and the key would be to connect or hitch those advantages while minimizing the disadvantages. The ability to be able to transport and use manual equipment in tow then quickly revert back to manual use as needed, would utilize that equipment to its fullest, greatly increase productivity and efficiency all while reducing user fatigue. Also, by hitching together equipment you already own would make it very cost effective.

However, such a tow hitch would require seamless interchangeability from ride-on use to manual use for this to be a practical application. The attaching and/or detaching process of any length, requiring tools, pins or straps would defeat the efficiency. To repeat that process multiple times for a given job would only compound the inefficiency and severely reduce productivity. Therefore, it is critical that such a hitching device system would need to be quick and easy.

The landscaping and construction industry as well as homeowners who maintain their own larger properties utilize a variety of push/pull type manually powered equipment as well as powered/motorized equipment. For example, landscapers typically mow lawns with ride-on and stand-on mowers, particularly when they are attending to large properties. These mowers may range from small lawn tractors upon which the user sits, to large lawn tractors, to zero-turn industrial type mowers to mowers upon which the operator stands. Ride-on machines require no walking and are very productive in large wide-open areas or using equipment over long distances. A feature of these ride-on mowers is the inclusion of a receiver or mounting area for a hitch receiver which is typically employed to attach to the mower various towable type property care tools such as trailers, carts, aerators, fertilizer spreaders, sprayers, seeders, thatchers and the like. There are different types of hitch receivers and there are many types of hitch adapters to allow user to switch from one type of hitch to another. Although garden tractor and lawn mower hitch receivers used to consist of just a plate or bar bracket with a large centered hole to attach these equipment, it is now more common that other type of hitch receivers are available and/or equipped with these machines. Manufacturers are realizing the versatility benefits and value a hitch adds to their machines as many are incorporating and including the more stable square hitch receiver in their production of ride-on mowers. There are also third party manufacturers designing and producing hitch mounting brackets specifically fitted for each type of ride-on machine. One type of hitch receiver is a square receptacle for inserting square tubing. The hitch receiver typically has a square cross section or U-shaped section, and the most common sizes are two by two inches or 1.25 by 1.25 inches. By attaching equipment to the hitch receiver of the mower, the job of hauling, fertilizing, thatching, aerating, etc. can be done more quickly than if push/pull type equipment that is moved manually around the property.

Another tool that is frequently utilized by landscape professionals as well as homeowners and property owners is the wheelbarrow. An engineering marvel that has been time tested with a design the remains relatively the same today as it did hundreds of years ago. A wheelbarrow is essentially a small cart, or a small hand-propelled vehicle used for carrying loads, usually with just one wheel (some may have two or four wheels) designed to be pushed and guided by a single person using two handles at the rear. One-wheel wheelbarrows tend to be less stable than those with more. A wheelbarrow typically includes a pair of arms that converge toward the front of the wheelbarrow and diverge toward its rear for grasping by a user. Other wheelbarrows, or push/pull type lawn equipment, may have a single U-shaped, D-shaped or T-shaped handle. Wheelbarrow handles come in pairs and are often made either of wood or metal. The handles vary in length from 36 to 60 inches, depending on the size of the wheelbarrow tray. The handle ends are either wooden or metal and are often covered with vinyl or plastic grips for better handling. The wheelbarrow is designed to distribute the weight between the wheel and the user to enable carrying heavier loads than would otherwise be possible. The typical wheelbarrow is of the manual push type, which is more efficient and productive in small areas. However, user fatigue over greater distances and longer time periods limit their productivity. Therefore, the ability to attach a wheelbarrow to the hitch receiver of a lawn tractor or other such powered tow vehicles would be a distinct advantage. However, there are situations where it would be advantageous to utilize the wheelbarrow manually, particularly in small areas, restrictive areas or when negotiating around obstacles on the property.

Therefore, it would be advantageous to be able to quickly attach or detach a manual push/pull type wheelbarrow, cart, wagon, push blower, or other such lawn maintenance equipment to a lawn tractor or similar powered tow vehicles. In this way, the wheelbarrow can be attached to the powered tow vehicle when transport over a large wide-open space is required. Furthermore, when the user needs to transport the wheelbarrow to areas otherwise not possible attached, such as in a small area or when there are obstacles, it would be advantageous to be able to detach the wheelbarrow from the powered tow vehicle quickly and without the need for tools, pins or straps.

Such are the objectives of the present invention. Other objectives, advantages and novel features, and further scope of applicability of the present invention will be set forth in the detailed description to follow, taken in conjunction with the accompanying drawings, and in part will become apparent to those skilled in the art, upon examination of the following, or may be learned by practice of the invention. The objectives and advantages of the invention may be realized and attained by means of instrumentalities and combinations particularly pointed out in the appended claim or claims.

SUMMARY OF THE INVENTION

At least one or more embodiments of the present invention provide a device for attaching a wheelbarrow to a powered tow vehicle. More specifically, one or more embodiments of the present invention provide a device to attach a wheelbarrow or other piece of landscaping equipment to the hitch receiver of a ride-on or stand-on mower that can be readily and quickly attached and detached without tools, pins or straps and allows yaw and pitch while restricting roll movements of the wheelbarrow relative to the power tow vehicle.

One or more embodiments of the present invention provide a device to attach a wheelbarrow, push blower, hand cart or other property maintenance equipment to a powered tow vehicle or other such vehicle that has a hitch receiver. A device of one or more embodiments of the present invention comprises generally two distinct parts.

The first part of the present invention is a hitch device or first apparatus which connects to the hitch receiver of a power mower. The hitch device, which is described more fully herein, contains a hitch receiver adapter to be inserted into the hitch receiver of a powered tow vehicle. Extending upward from the hitch receiver is a vertical tube to adjust the height of the device receiver to align with the powered tow vehicle's hitch receiver. Atop of the adjustable vertical tube sits a clamp mechanism that is utilized to retain a bar or tube horizontally yet will allow rotation of bar within the clamp. A shaft and housing assembly makes the connection between a vertical tube and the clamp mechanism which allows left to right rotation of the clamp mechanism relative to the tow vehicle.

The second part of one or more embodiments of the present invention is a round bar which mounts horizontally and securely attaching to the handles of a wheelbarrow or other equipment to be towed. This horizontal round bar typically may be a tubular bar having length slightly longer than the distance between the two handles of the wheelbarrow and is mounted near the handle hand grips.

When the round bar is placed on and locked into the hitch device of the first part, the attached wheelbarrow is free to rotate left and right and up and down during tow relative to the power tow vehicle and allow wheelbarrow to remain stable at stand still or in tow. By utilizing the present invention, the equipment in tow may be quickly attached and instantly detached from the powered tow vehicle without the use of any tools, pins or straps when wheelbarrow is fully loaded or empty.

Multiple horizontal round bars may be installed onto multiple equipment for efficiency and cost-effectiveness to use more equipment with one hitch device. In this fashion, the same powered tow vehicle can be employed to tow multiple equipment and/or wheelbarrows without the need to detach and re-attach the horizontal attachment bar. Also, for large mulch spreading projects, for example, multiple wheelbarrows can be utilized in the process of loading, transporting and spreading of the mulch material. With the ability to quickly attach and detach from the tow vehicle, loaded and emptied wheelbarrows can be cycled back and forth from loading area to dump locations without having to wait for loading, completing the job more efficiently and with little effort.

The round bar by itself has many advantages due to its location attached to the wheelbarrow handles. Not only improving the stability and strength of the wheelbarrow, but when manually using the wheelbarrow detached from hitch device, the round bar allows user to engage their hips and other leg muscles for easier use when pushing a loaded wheelbarrow up hills and to gain initial momentum from stand still. The round bar also provides an alternate grip that allows user to engage larger back muscles when pulling wheelbarrow backwards up and over obstacles (i.e. street curbs). Dumping of load is also improved with more control. Also saves space on trailers. After loading mower on to a trailer with the wheelbarrow in tow, the wheelbarrow can be rotated up and over the hitch device to rest upside down on top of mower. Simply strap down to transport.

In at least one embodiment of the present invention, an apparatus is provided which is comprised of a first apparatus comprised of: a cradle clamp head assembly; a vertical body assembly having a first end and an opposing second end, the cradle clamp head assembly configured to be attached to the vertical body assembly closer to the first end of the vertical body assembly than the second end of the vertical body assembly; and a hitch receiver adapter configured to be attached to the vertical body assembly, while the cradle clamp head assembly is attached to the vertical body assembly, such that the hitch receiver adapter is further from the first end of the vertical body assembly than the cradle clamp head assembly.

The apparatus may also be comprised of a second apparatus comprised of: a first bar having a first end and a second end opposite the first end; and a first attachment device configured to attach the first bar to a wheelbarrow.

In at least one embodiment, the first apparatus is configured to be removably attached to the second apparatus to removably attach the wheelbarrow to a power tow vehicle through the second apparatus and the first apparatus.

In at least one embodiment, the cradle clamp head assembly is configured to rotate with respect to the vertical body assembly.

The apparatus may further include a swivel lock bar; and wherein the cradle clamp head assembly is configured to rotate with respect to the vertical body assembly, when the swivel lock bar is in an unlocked state; and wherein the cradle clamp head assembly is not configured to substantially rotate with respect to the vertical body assembly, when the swivel lock bar is in a locked state.

In at least one embodiment, the hitch receiver adapter is configured to removably attach to a hitch receiver of the power tow vehicle. The hitch receiver adapter may be configured to be attached to the vertical body assembly at different locations, with respect to the vertical body assembly.

In at least one embodiment, the cradle clamp head assembly includes: a pull handle; a first pivot arm; and a second pivot arm; wherein the first bar of the second apparatus is configured to be attached to the first apparatus by moving the pull handle to cause the first and second pivot arms to simultaneously pivot.

In at least one embodiment, the cradle clamp head assembly further includes: a cradle base; a first stop tab; and a second stop tab; and wherein the first bar of the second apparatus is configured to be attached to the first apparatus by moving the pull handle to cause the first and second pivot arms to simultaneously pivot until the first bar of the second apparatus is on the cradle base, and between the first and second stop tabs and the first and second pivot arms.

In at least one embodiment, when the first bar of the second apparatus is on the cradle base and between the first and second stop tabs and the first and second pivot arms, a first end of the pull handle is configured to slide into a lock rod hole of a plate to lock the first bar of the second apparatus to the first apparatus.

In at least one embodiment, when the first bar of the second apparatus is on the cradle base and between the first and second stop tabs and the first and second pivot arms, a lever rod handle connected to the pull handle is configured to rotate the pull handle until the pull handle is locked in a state in which the first end of the pull handle is held in the lock rod hole of the plate.

In at least one embodiment of the present invention, a method is provided which includes attaching a first apparatus to a hitch receiver which is connected to a power tow vehicle; and attaching the first apparatus to a second apparatus which is connected to a wheelbarrow. The first and second apparatuses may be configured as previously described.

BRIEF DESCRIPTION OF THE DRAWINGS

For a better understanding of the present invention, identifying part numbers are listed in the detailed description of the invention. Also, reference is made to the following description of an exemplary embodiment thereof, considered in conjunction with the accompanying drawings, in which.

DETAILED DESCRIPTION OF THE INVENTION

At least one or more embodiments of the present invention provide a hitch device to attach equipment and/or a manual wheelbarrow to a hitch receiver of a powered tow vehicle that is equipped with a hitch receiver. It will be understood that when the term wheelbarrow is used in this disclosure, it can be taken to mean any manual push/pull lawn or garden care equipment with one or more wheels such as a cart or leaf blower having two handlebars or one continuous U-shaped handlebar such as a hand cart or tote tool box, etc. It will also be understood that wherever the term powered tow vehicle (motorized or electric power) is used in the present application, that term represents the following but not limited to; ride-on mower, stand-on mower, power mower, lawn mower, zero-turn mower, tractor, self-propelled vehicle, ATV (all-terrain vehicle), that is capable of having a hitch receiver adaptable to a square hitch receiver (most commonly two inches or one and one quarter inches).

Figure 1:
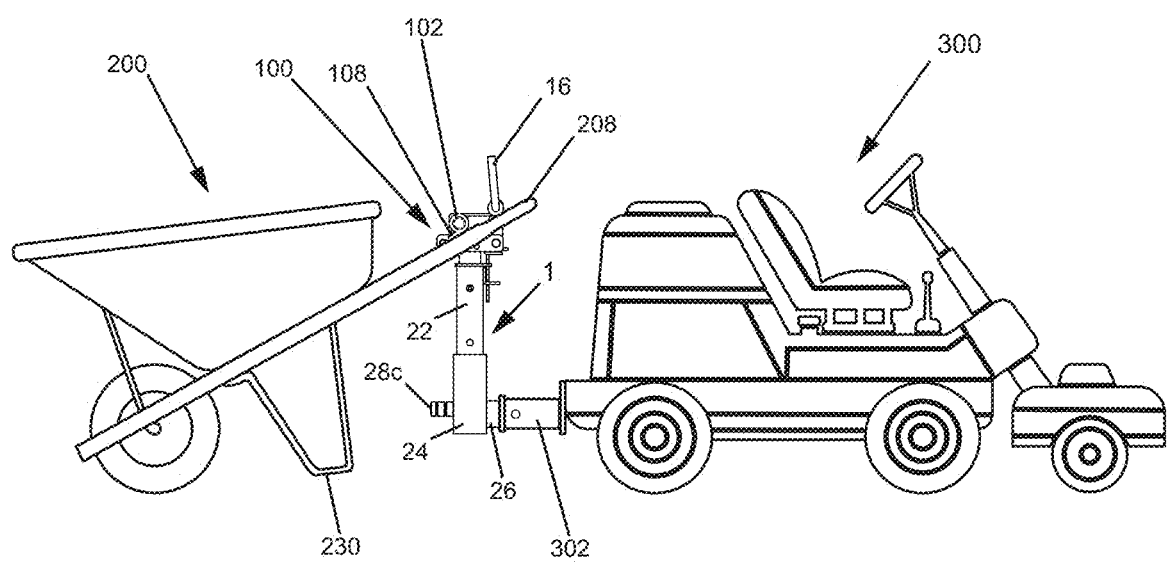
FIG. 1 is a side view of a wheelbarrow attached by a first apparatus or hitch device and a second apparatus or attachment key bar assembly to a hitch, which is connected to or integrated with a powered tow vehicle.
Figure 2:
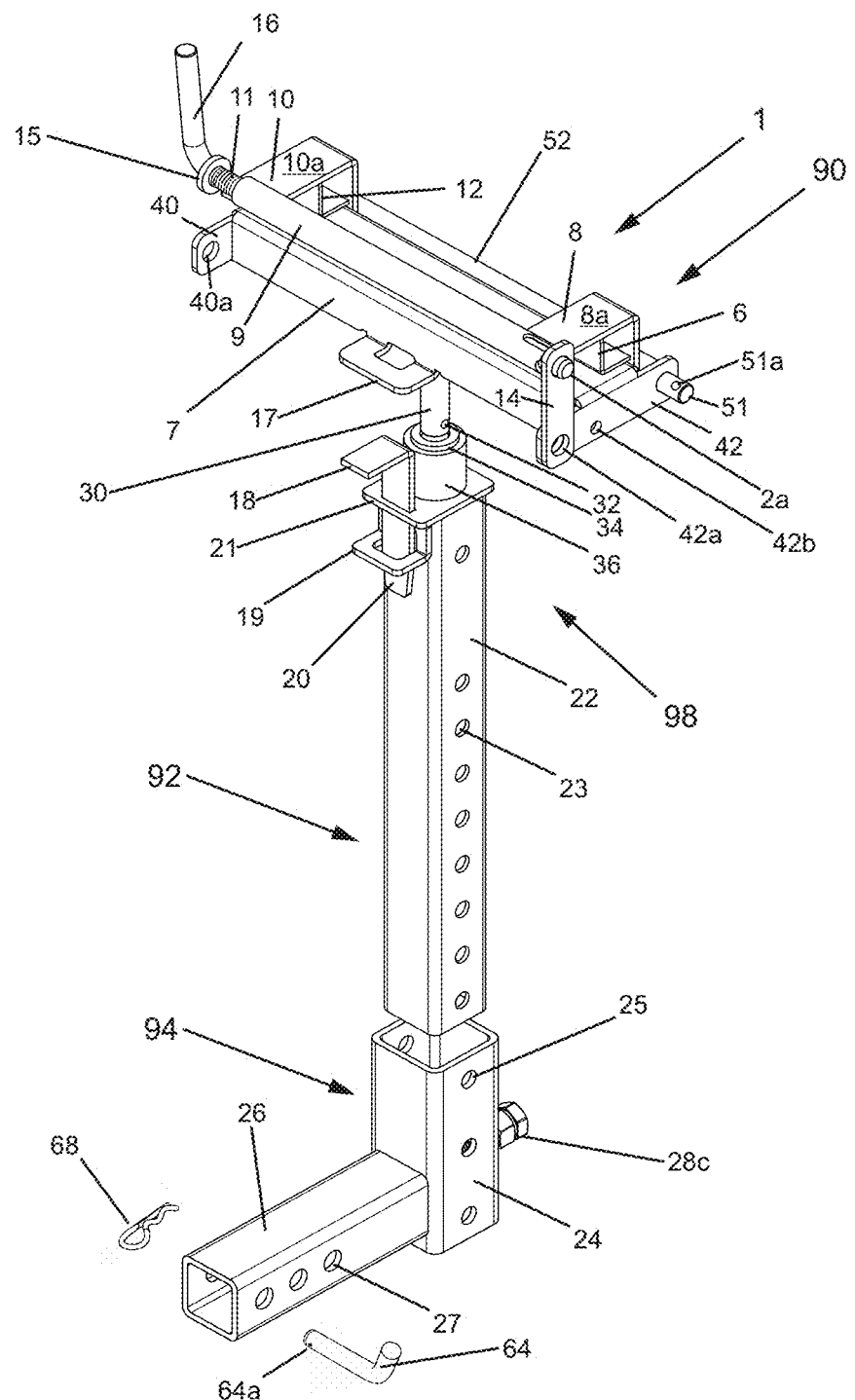
FIG. 2 an expanded view and is a top, front, and right side perspective view of the first apparatus 1 in a first state where a lever rod handle of the first apparatus is in a locked position ready for instant release.
Figure 12:
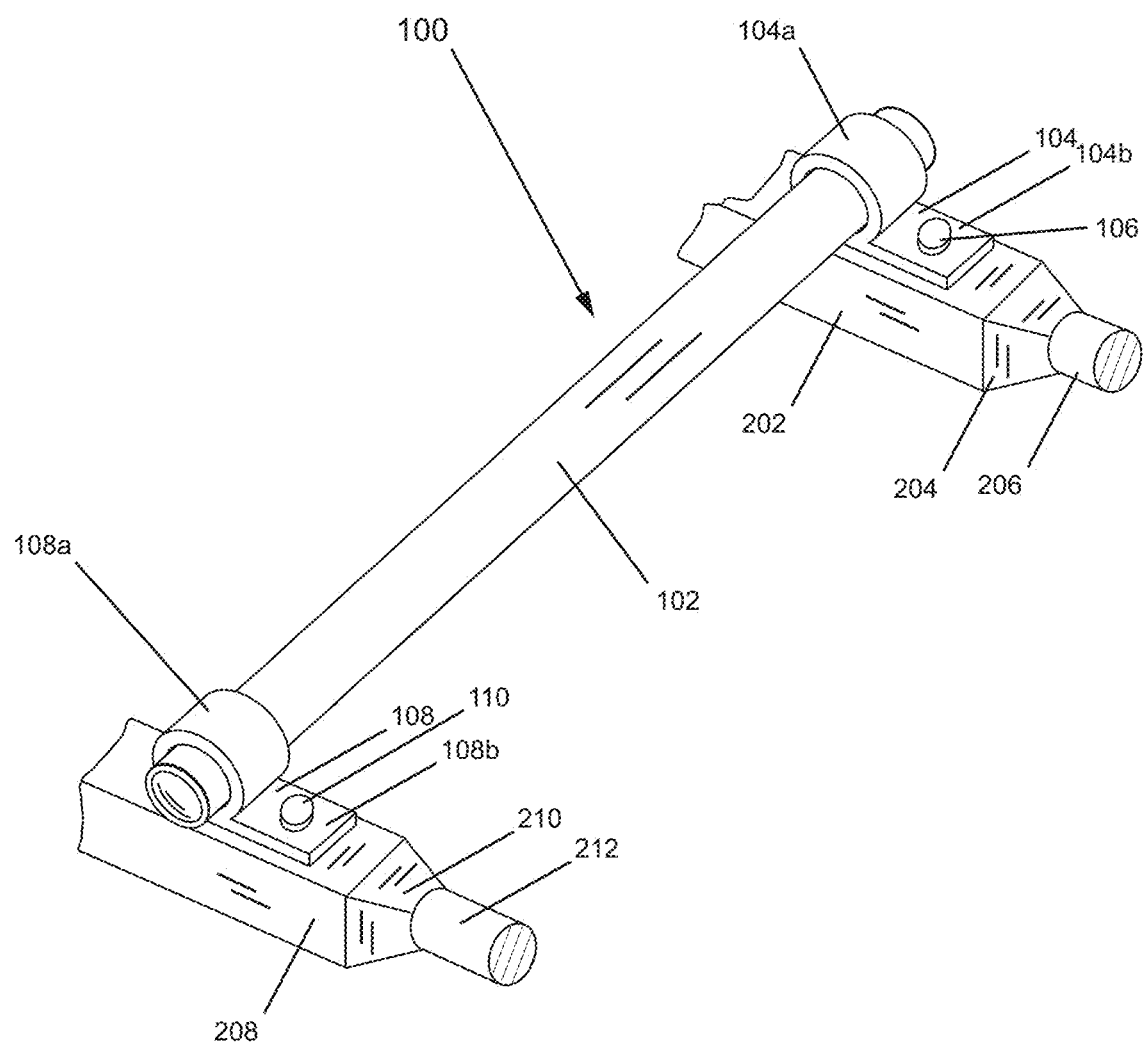
FIG. 12 is a perspective view of the second apparatus for attaching to a wheel barrow, and parts of two handles of the wheel barrow shown in FIG. 1.
Figure 18:
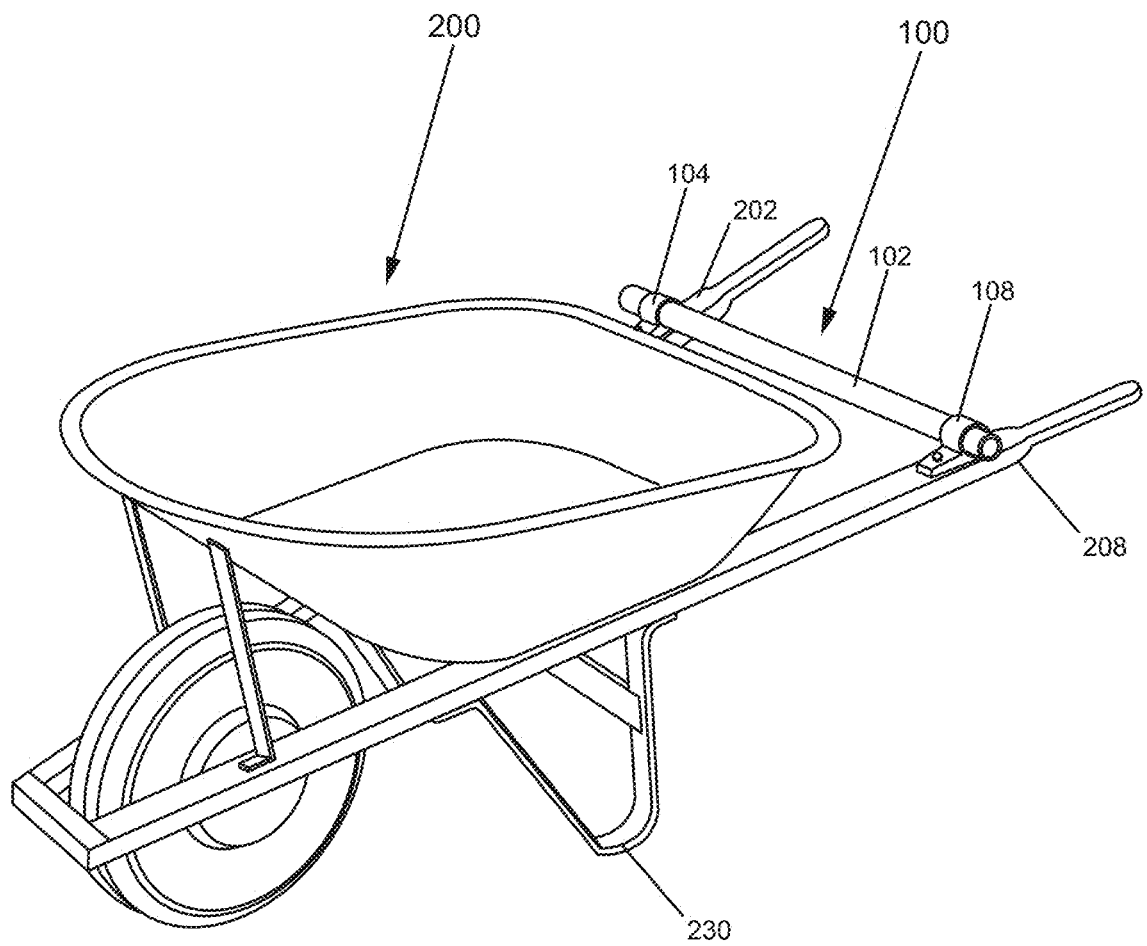
FIG. 18 is a perspective view of the wheelbarrow of FIG. 1, with the second apparatus of FIG. 12 attached to the wheel barrow of FIG. 1.

At least one embodiment, of the present invention, includes two parts: a first apparatus or hitch device 1, as shown in FIG. 2, and a second apparatus or attachment key bar 100, as shown in FIG. 12. In at least one embodiment, the first part or first apparatus 1 includes a device that attaches to a hitch receiver 302 of a powered tow vehicle 300 to tow a wheelbarrow 200, as shown in FIG. 1. In at least one embodiment, the second part or second apparatus 100 is an equipment attachment bar that includes a member 102 which may be a tube or round bar, which is attached horizontally and perpendicularly or close to perpendicular across two handles 202 and 208 of a wheelbarrow 200, as shown by FIGS. 1 and 18.

Figure 5:
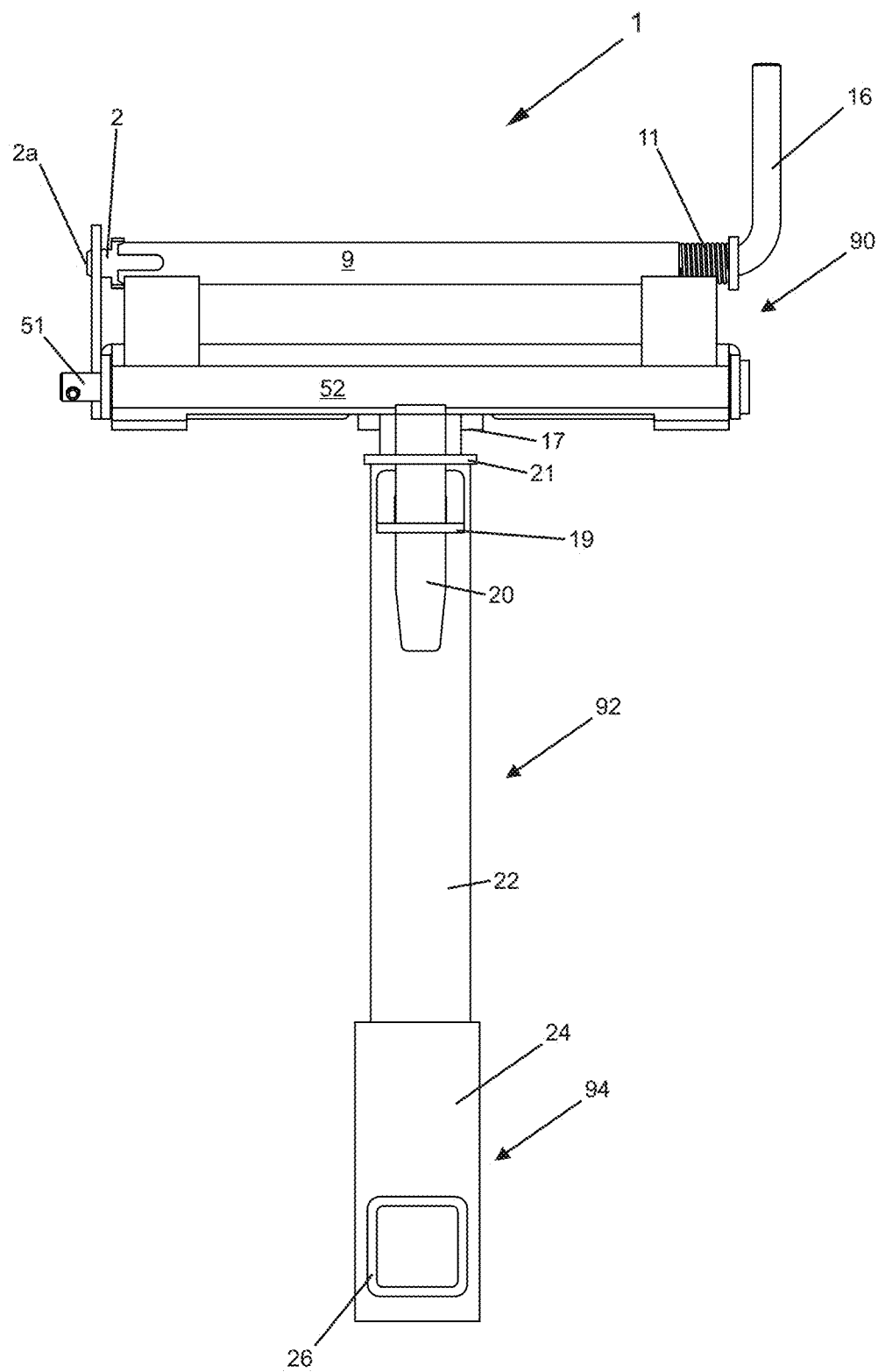
FIG. 5 is a rear view of the first apparatus shown in the fourth state; hitch receiver adapter at lowest height adjustment to align with tow vehicle hitch and cradle rotated one hundred eighty degrees.

Referring to FIG. 5, the first apparatus or hitch device 1, in at least one embodiment, includes: a cradle clamp head assembly 90; a vertical body assembly 92; a hitch receiver adapter 94, and a locking member (includes 18 and 20, shown in FIG. 2).

The cradle clamp head assembly 90 (FIG. 19) may include: a lever rod handle 16 integrated with a lever rod 2, having a lever rod end 2a, a fixed washer 15, a spring 11, a pull handle 9, lever rod notch pin 4 (shown in FIG. 7), deep notch 4a, shallow notch 4b, lock rod hole 14a (shown in FIG. 8), a pivot arm 8 and 10, a pivot tube 52, a pivot rod 51 that has a tension pin hole 51a, a tension pin 51b (shown in FIG. 10), a cradle base 7, stop tab 6 and 12, cradle arm stop 3 and 5, side plate 40, vertical plate 14 and side plate 42 (shown on FIG. 8), an upper lock bar guide 17 (shown in FIG. 6), a shaft 30, a shaft pin 32 (shown on FIG. 9), a shaft pin insert 32a.

The distance between each pivot arm 8 and 10 on the pivot tube 52 may vary from up to the length of the cradle base 7 to touching in the center making one large pivot arm component from pivot arm 8 and 10. The stop tab 6 and 12 may be fixed in place independently of the pivot arms 8 and 10 on the cradle base 7 and may have a distance apart up to the length of the cradle base 7 to place together in the center of cradle base 7. Other configurations are contemplated in accordance with other embodiments of the present invention. One or more of the components shown for the cradle clamp head assembly 90 in FIG. 19, may not be provided and may not be required in one or more embodiments.

Figure 3:
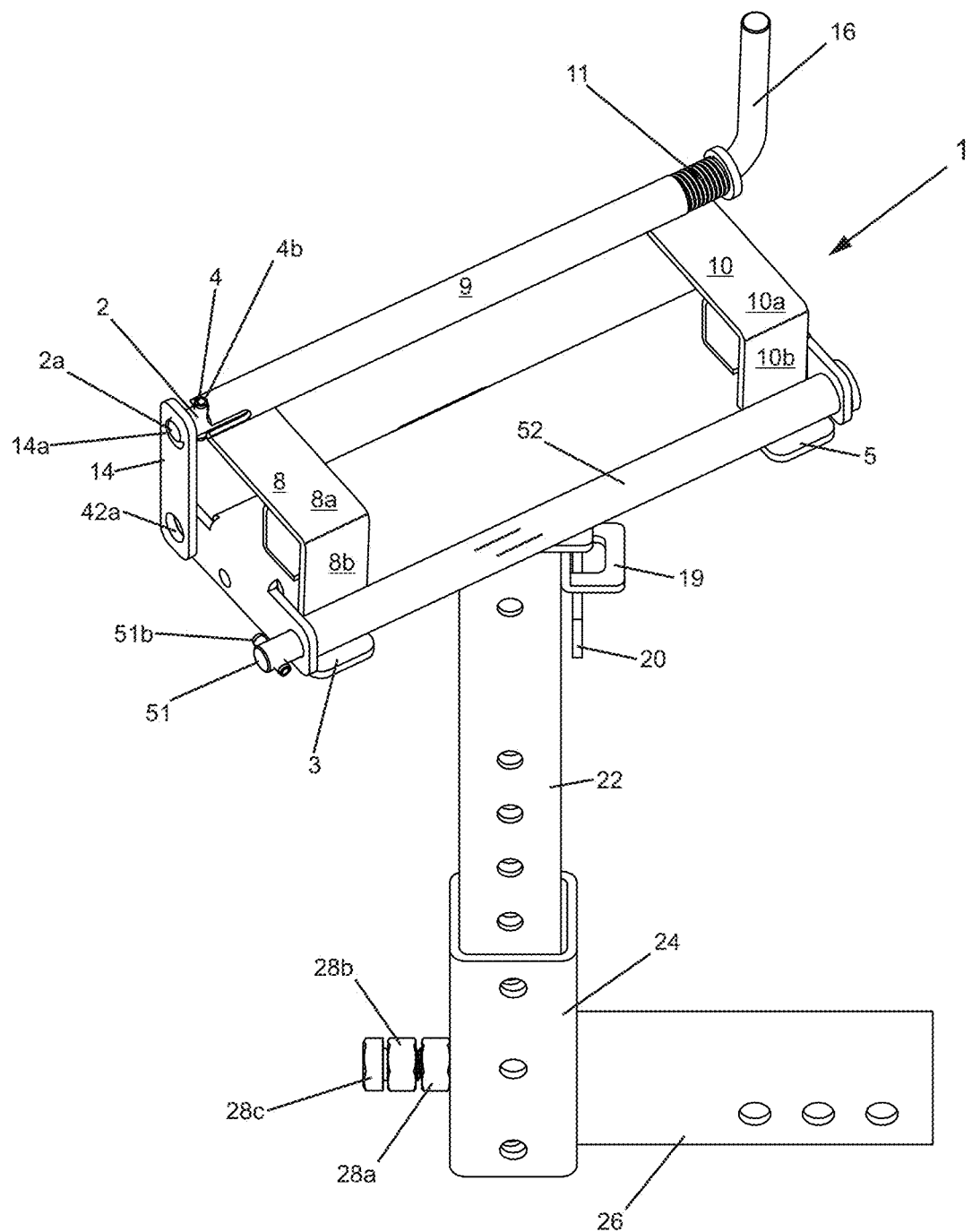
FIG. 3 is a perspective view of the first apparatus 1 shown in a second state.

The pull handle 9 may be a hollow tube in which the lever rod 2 slides. The lever rod handle 16 is substantially at a right angle with respect to the lever rod 2. The spring 11 surrounds or is located on the lever rod 2. The lever rod 2 has an end 2a, which is shown inserted into an opening 14a, in FIG. 2. The pull handle 9 is fixed to pivot arms 8 and 10 so that pull handle 9 does not rotate with respect to pivot arms 8 and 10. Each of the pivot arms 8 and 10 are L-shaped members. As shown in FIG. 3, the pull handle or tube 9 is fixed to members 8a and 10a of the L-shaped members 8 and 10, respectively. The L-shaped members 8 and 10 also include members 8b and 10b, which are typically fixed at a right angle with respect to the members 8a and 10a, respectively.

Figure 9:
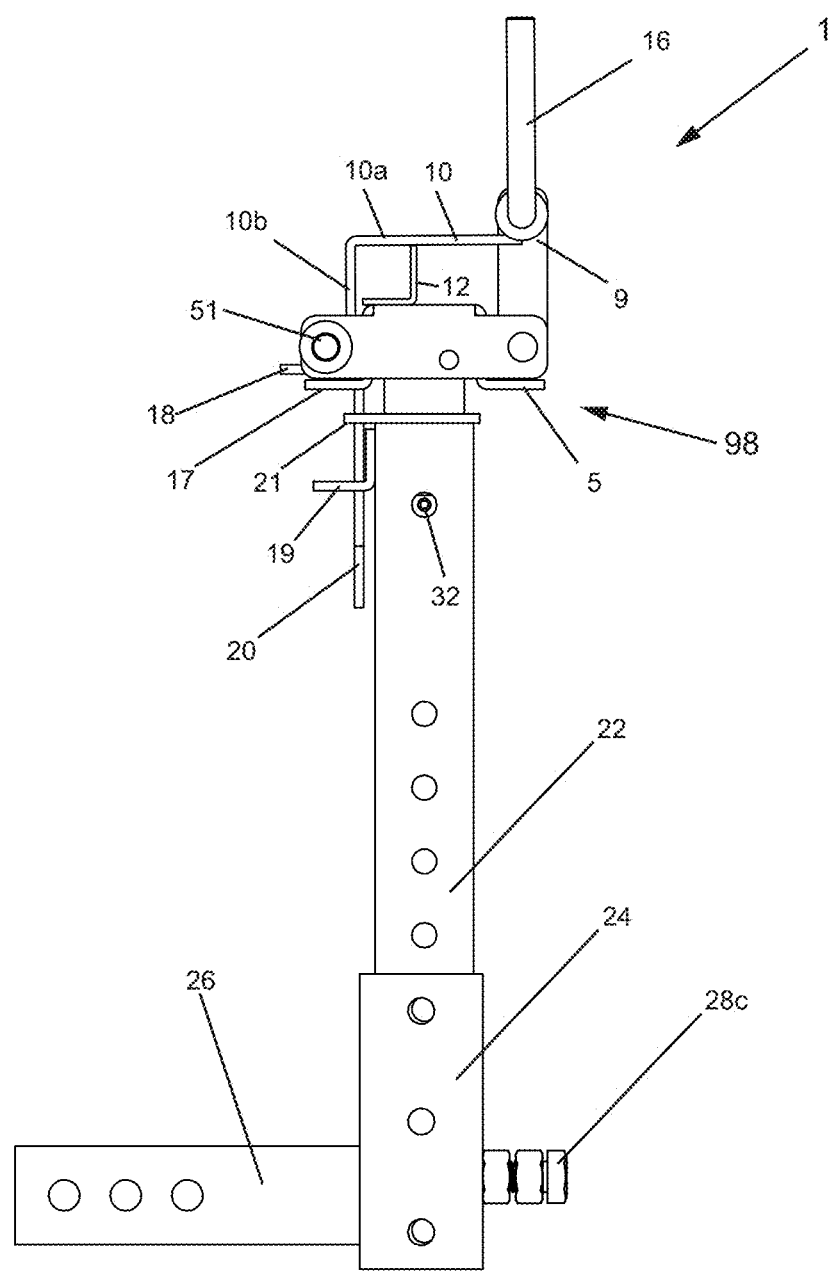
FIG. 9 is a right side view of the first apparatus in a nineth state.

As shown by FIG. 9, the member 10b is fixed to pivot tube 51, and the member 10a is fixed to pull handle 9. Similarly, the member 8b is fixed to pivot tube 51 and the member 8b is fixed to pull handle 9.

Figure 6:
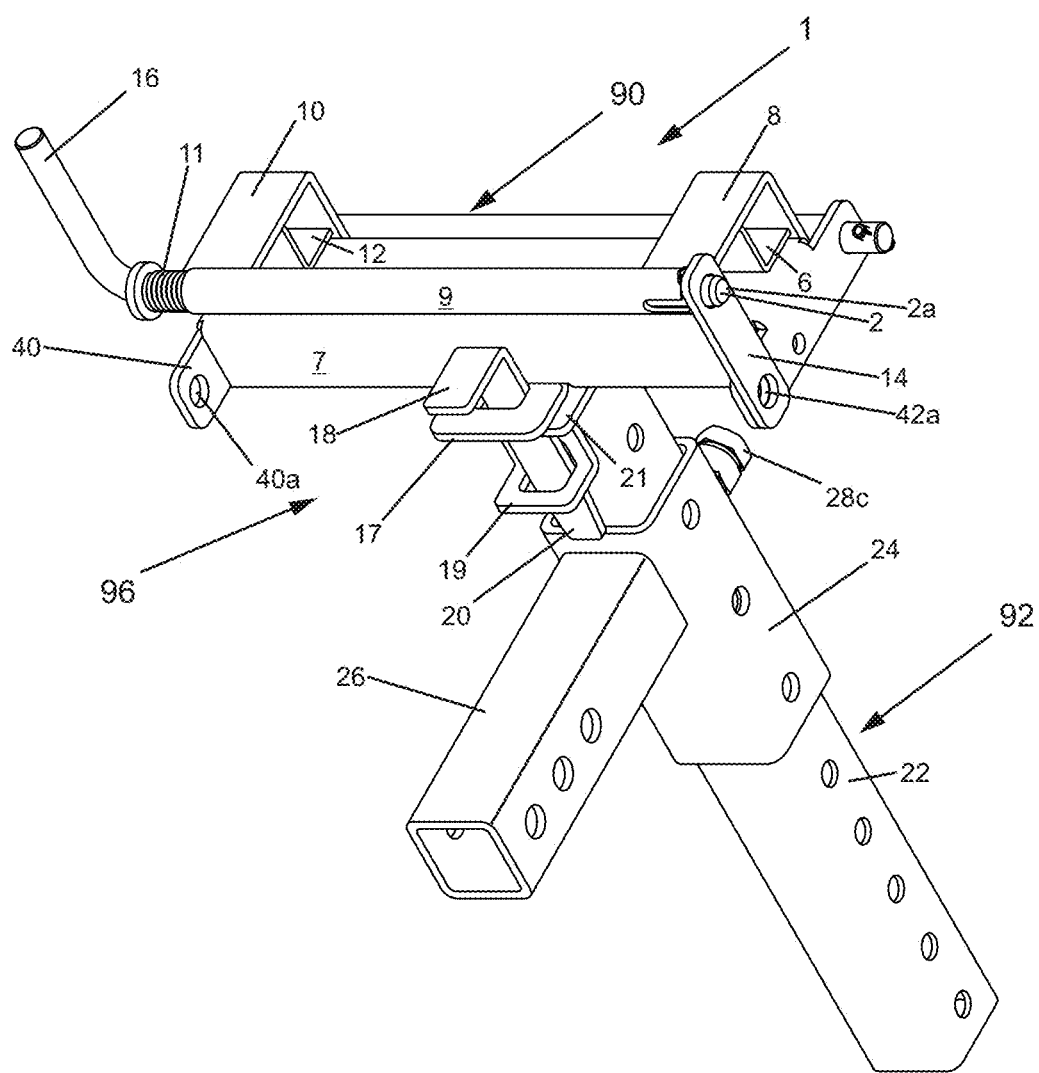
FIG. 6 is a top, front, and right perspective view of the first apparatus in a fifth state.
Figure 7:
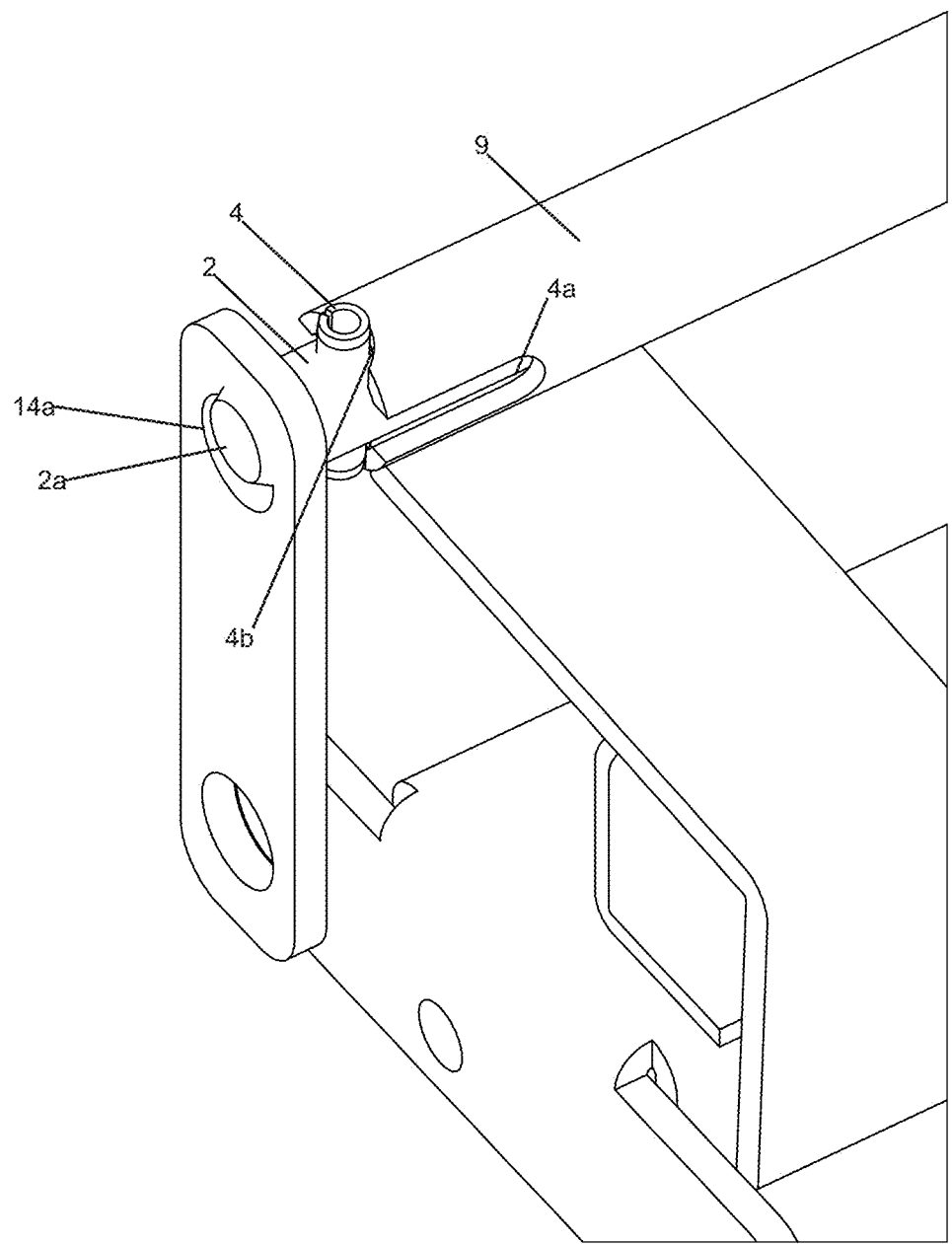
FIG. 7 is a perspective close up view of the lever rod notch pin of the first apparatus in the locked position.

The vertical body assembly 92 (FIG. 20B) may include: a shaft housing 36, bushings 34, an adjustable vertical tube 22, incremental adjustment holes 23, a center lock bar guide 21, a lower lock bar guide 19, and a swivel lock bar (includes members 18 and 20 shown in FIG. 6). The bushings 34 are replaceable and made of various materials that may include maintenance-free composite polymer bushings, greasable bronze bushings or ball bearing-type assemblies that allow longer wear life by minimizing rotational friction between shaft 30 and shaft housing 36. To replace bushings 34 when worn, first remove shaft pin 32 (FIG. 9) with tools (not shown) using the pin access hole 22a on vertical tube 22 (FIG. 3). This allows cradle clamp head assembly 90 to be separated from the vertical body assembly 92 as shown in FIG. 2. Next, separate the hitch adapter assembly 94 from the vertical tube body assembly 92 by removing the hitch pin 64 and clip 68 from alignment pin aperture 25 and incremental hole 23. Now the completely separated vertical body assembly 92 (FIG. 20B) allows clear access of bushings 34 for removal.

The hitch receiver adapter assembly 94 (FIG. 21) may include; a short receiver 26 with adjustment holes 27, a ninety degree collar 24 with alignment pin apertures 25, a hitch pin 64 and clips 68, a fixed nut 28a, a jam nut 28b and an anti-rattle set bolt 28c.

The short receiver 26 and ninety degree collar 24 is configured with a square cross section or even a U-shaped section and secured together in an L-shape. The horizontal aspect is the short receiver 26 that is inserted into the hitch receiver 302 of the power mower 300 and the ninety degree collar 24 is the vertical aspect extending upward approximately ninety degrees from the horizontal aspect short receiver 26, as shown in FIG. 1.

The hitch receiver adapter 94 can be configured so that the short receiver 26 fits either of the most common hitch receiver sizes (2.0×2.0 inches or 1.25×1.25 inches), or any other hitch receiver type and size. The short receiver 26 should have an exterior dimension just slightly smaller than the hitch receiver 302 on the mower 300. The short receiver 26 includes adjustable pin apertures 27 for insertion of a hitch pin 64, shown in FIG. 2 into an aperture on the hitch receiver 302 of the power mower 300, and then an aperture of apertures 27, and then insertion of a clip 68 through an opening 64a on the hitch pin 64 to hold the hitch pin 64 in place. The length of the short receiver 26 will typically be available in longer lengths to accommodate tow vehicles requiring additional clearance between the back of a tow vehicle and the tow equipment. Extending upward from the hitch receiver adapter 94 is an adjustable vertical tube 22 which is inserted into the ninety degree collar 24. Using the incremental holes 23 allows a height adjustment of the cradle clamp head assembly 90. Aligning the incremental holes 23 on the adjustable vertical tube 22 with a hole on the ninety degree collar 24 and inserting the adjustment hitch pin 64 (FIG. 2) and clips 68 (FIG. 2) into the alignment pin apertures 25 of the ninety degree collar 24, maintains a set height. Once a height is set, the connection between the ninety degree collar 24 and the adjustable vertical tube 22 can be made rigid by turning inward the anti-rattle set bolt 28c. The end of the bolt 28c fills-in the space between the outer wall of the adjustable vertical tube 22 and the inner wall of the ninety degree collar 24. To secure the anti-rattle set bolt 28c from vibrating out, one can tighten down the jam nut 28b against the fixed nut 28a (FIG. 3).

In the present application, in one or more embodiments, one or more components may be "fixed" to one or more other components by welding, bolting or by other means to securely fasten one or more components to one or more other components in a permeant or semi-permanent fashion."

The first apparatus or hitch device 1 may require the second apparatus or attachment key bar 100 to be mounted to towed equipment's handles 202 and 208 (shown in FIGS. 1 and 18).

FIG. 12 is a perspective view of the second apparatus or attachment key bar 100 for attaching to the wheelbarrow 200 and parts of two handles 202 and 208 of the wheelbarrow 200 shown in FIG. 1.

Referring to FIG. 12, the second apparatus or attachment key bar 100 may include a tube, member, or round bar 102 and may also include an off-set flange or other types of mounting brackets 104 and 108 with fasteners 106 and 110. In at least one embodiment, the bar 102 is preferably round. The bar 102 is configured to be held tightly in the mounting bracket 104 and 108 with set-screws (or by other means) or may be allowed to rotate freely within the mounting brackets. The mounting brackets 104 and 108 have loop portions 104a and 108a, and straight portions 104b, and 108b, respectively. The straight portions 104b and 108b are attached by fasteners 106 and 110, to the handles 202 and 208, respectively. The fasteners 106 and 110 may be screws, bolts, nails or any other known fasteners. The second apparatus or attachment key bar 100 is securely attached to the handles 202 and 208, respectively, of the wheelbarrow 200 using mounting brackets 104 and 108, however, the bar 102 can be attached to handles 202 and 208 without the use of a mounting brackets and with only fasteners 106 and 110 inserted through holes made through the ends of bar 102. The handles 202 of the wheel barrow 200 may include a portion 204 and a portion 206. The handles 208 of the wheelbarrow 200 may include a portion 210 and a portion 212. The handles of the wheelbarrow 200 or other equipment are commonly made of wood or steel with a round or square cross section. There are available various mounting brackets to accommodate these types of handle constructions to fasten the bar 102 to them that can be used but are not detailed here.

The bar 102 may be a tubular rod or solid bar with length slightly longer than a distance between the two handles or members 202 and 208 of the wheelbarrow 200, shown in FIG. 12 and FIG. 18. The bar 102 can be made of various materials that include but not limited to steel or materials of aluminum, plastic, PVC (polyvinyl chloride) that will allow for lighter equipment handle bar weight for a user when detached from the first apparatus or hitch device 1 for manual use.

Each piece of equipment to be towed (i.e., such as the wheelbarrow 200 in FIG. 1) may have its own bar 102 attached to it so that a device of at least one embodiment of the present invention can be employed quickly for multiple wheelbarrows without the need to detach the appropriate bar 102. The bar 102 for each wheelbarrow, such as wheelbarrow 200 is typically mounted horizontally across the equipment's handles, such as 202 and 208, either on top or underneath or in between the handlebars, and sits in a direction generally perpendicular to the handles 202 and 208. The attachment key bar 100 mounts to the handles 202 and 208 of the wheelbarrow 200 in a location near and before wheelbarrow's handle grip portions 206 and 212, as shown in FIG. 12. Some equipment to be towed may already have a handle bar design that allows attachment to the first apparatus or hitch device 1 without the need for second apparatus or attachment key bar 100.

FIGS. 13-17 demonstrate how the first apparatus or hitch device 1 is attached to the second apparatus or attachment key bar 100.

Figure 13:
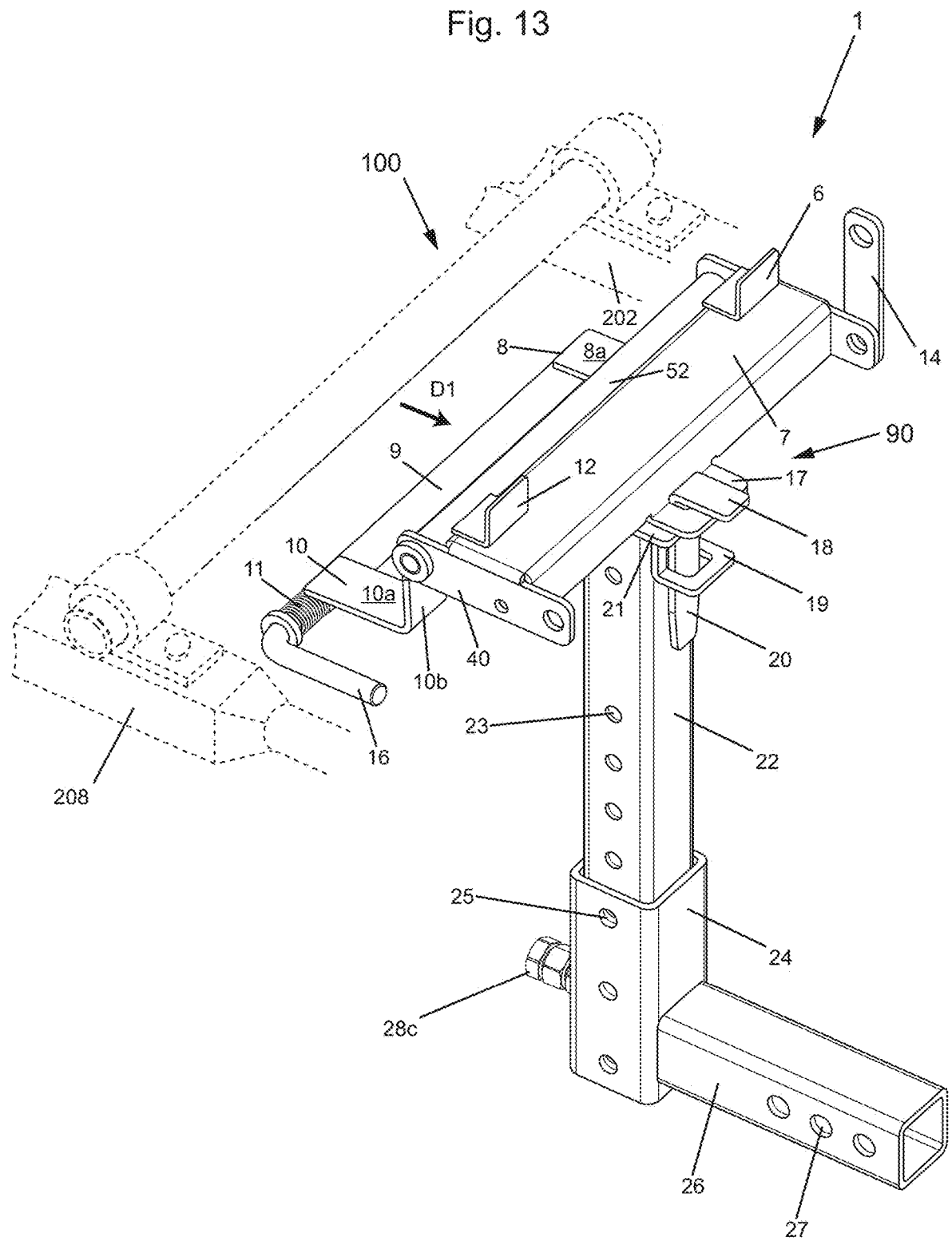
FIG. 13 is a perspective view of the second apparatus of FIG. 12 in dashed lines, with parts of two handles of the wheelbarrow of FIG. 1 shown in dashed lines, and with the first apparatus shown in a thirteenth state.

FIG. 13 is a perspective view of the first apparatus 1 shown in the open position ready to receive the second apparatus 100 shown in dashed lines.

Figure 14:
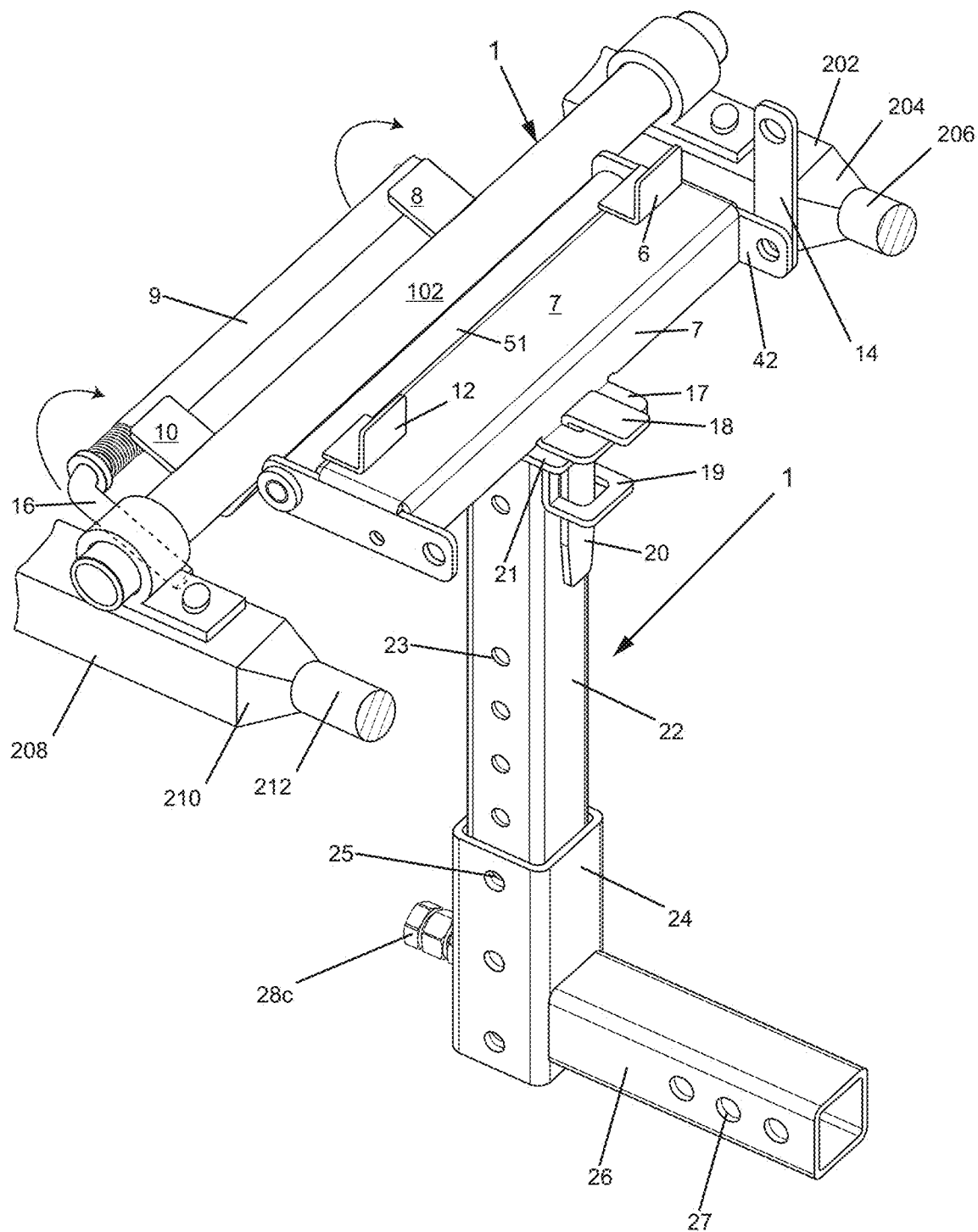
FIG. 14 is a perspective view of the second apparatus of FIG. 12, with parts of two handles of the wheelbarrow of FIG. 1, and with the first apparatus shown in a fourteenth state.

FIG. 14 is a perspective view of the first apparatus 1 self-aligning the bar 102 of the second apparatus 100 into the pivot arms 8 and 10 as the pull handle 9 is rotated up, with respect to the cradle base 7, using pivot member 51 and/or 52, to which pivot arms 8 and 10 are rotatably connected through members 8b and 10b, respectively.

Figure 15:
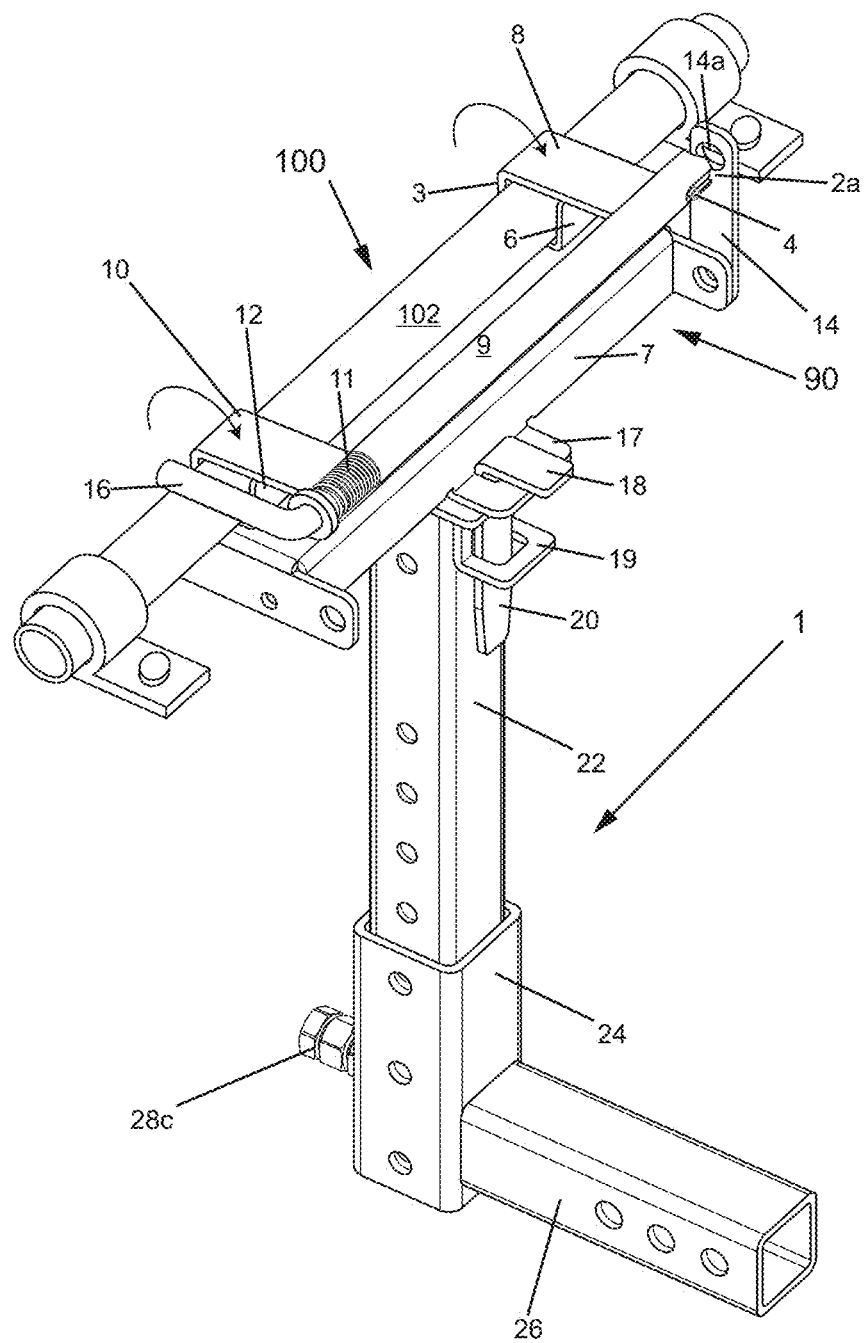
FIG. 15 is a perspective view of the second apparatus of FIG. 12, with the first apparatus shown in a fifteenth state.

FIG. 15 is a perspective view of the first apparatus 1 shown with the pull handle 9 fully rotated, with respect to the cradle base 7, over the bar 102 of the second apparatus 100, so that the bar 102 is shown resting on the cradle base 7. Although the cradle clamp head assembly 90 of the first apparatus 1 is in the closed position in FIG. 15, the bar 102 of the second apparatus 100 is not locked-in place with respect to the cradle base 7.

Figure 16:
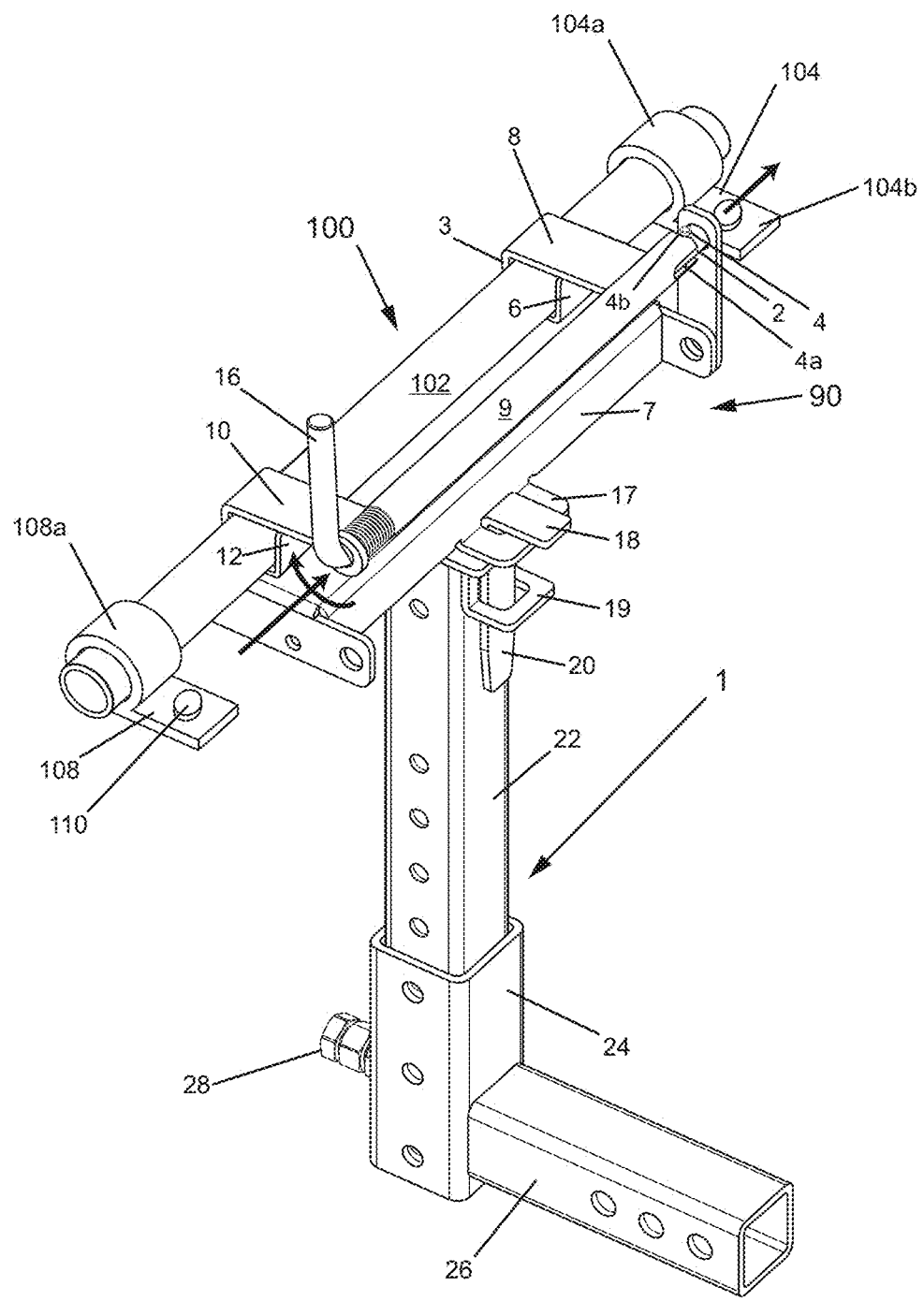
FIG. 16 is a perspective view of the second apparatus of FIG. 12, with the first apparatus shown in a sixteenth state.

FIG. 16 is a perspective view of the first apparatus 1 ready for tow with the bar 102 of the second apparatus 100 locked-in with the lever rod handle 16 rotated up for instant release. In FIG. 16, the member 2 which slides in tube 9, has an end 2a which is inserted into opening 14a of plate 42, as shown in FIG. 3, and the pin 4 is within the shallow channel 4b of the member 9, which prevents the end 2a from sliding out the opening 14a.

Figure 17:
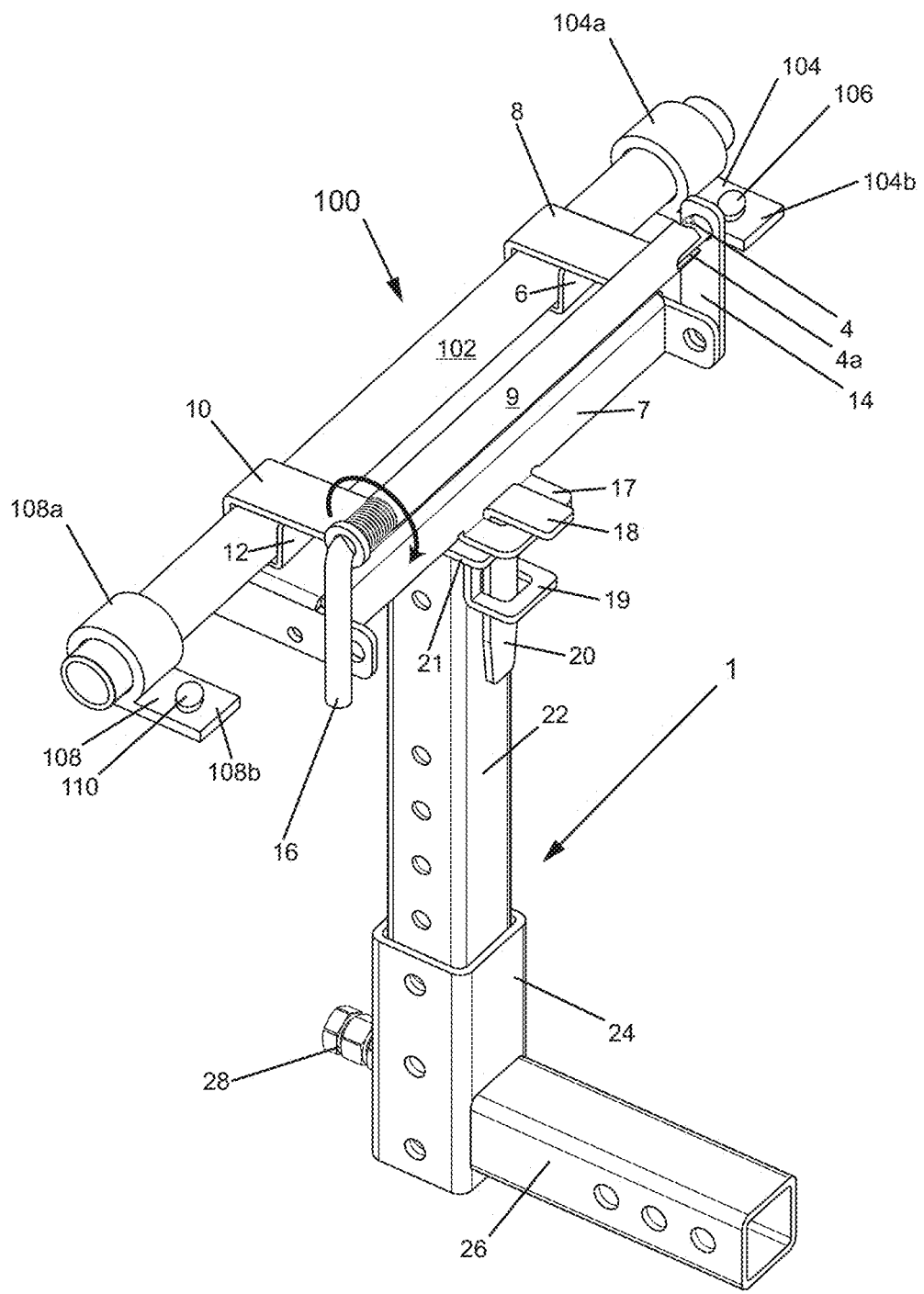
FIG. 17 is a perspective view of the second apparatus of FIG. 12, with the first apparatus shown in a seventeenth state.

FIG. 17 is a perspective view of the first apparatus 1 ready for tow with the round bar 102 of the second apparatus 100 locked in a more secure position by having the lever rod handle 16 rotated down, which rotates the member 2, so that pin 4 is in narrow channel 4b of the tube 9 which prevents the end 2a from leaving the opening 14a of the plate 14. The plate 14 is the vertical aspect and the plate 42 is the horizontal aspect plate.

FIG. 18 is a perspective view of the wheel barrow 200 of FIG. 1, with the second apparatus 100 of FIG. 12 attached to the wheel barrow 200 of FIG. 1.

Figure 19:
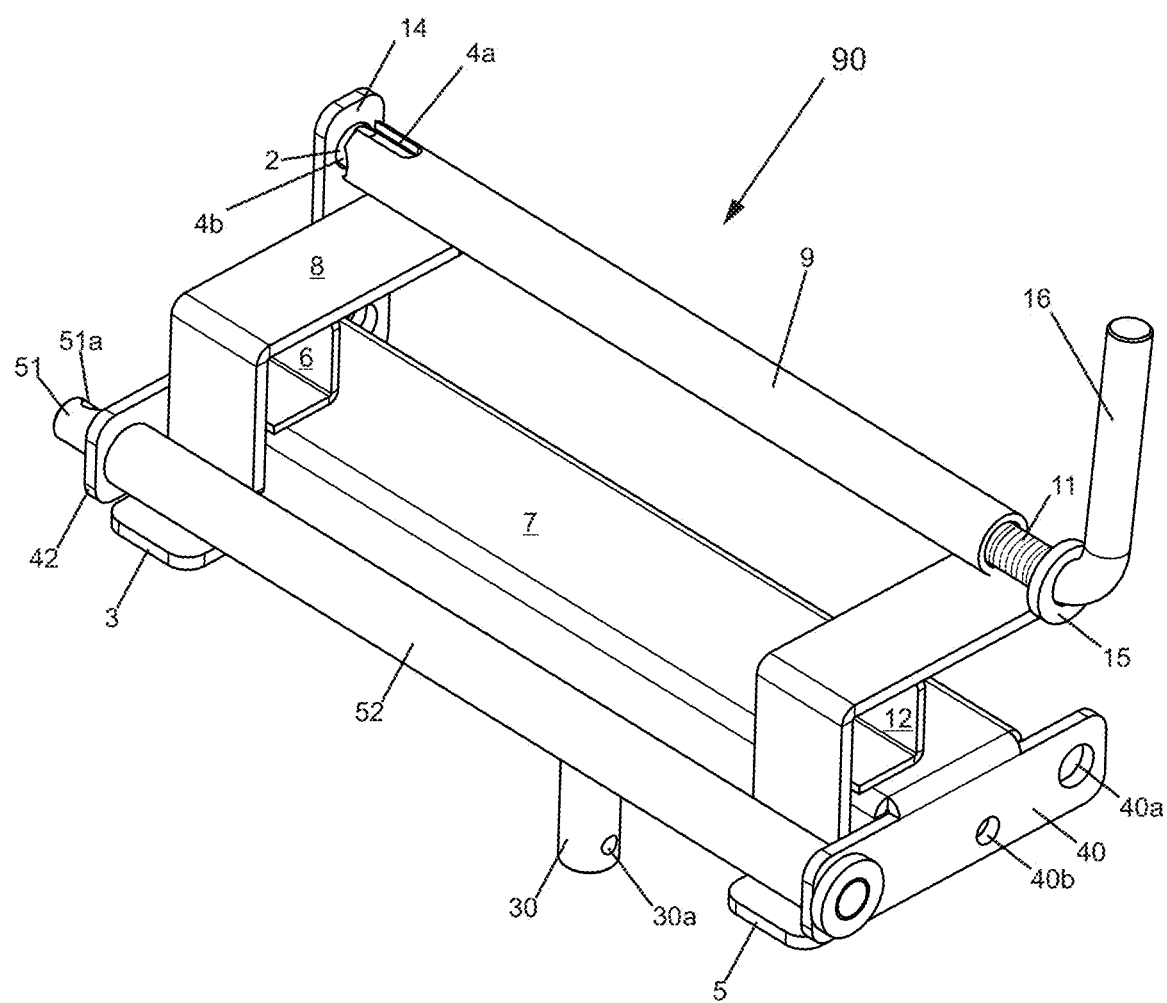
FIG. 19 is a perspective view of a cradle clamp head assembly of the first apparatus.

FIG. 19 is a perspective close up view of the cradle clamp head assembly 90 of the first apparatus 1.

Figure 20A:
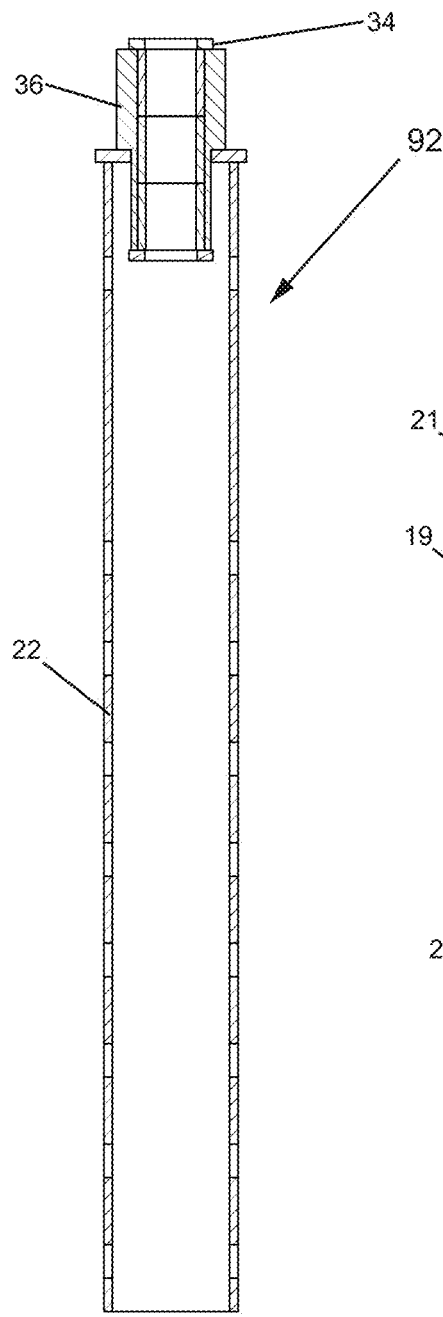
FIG. 20A is a cross sectional of a vertical body assembly of the first apparatus.
Figure 20B:
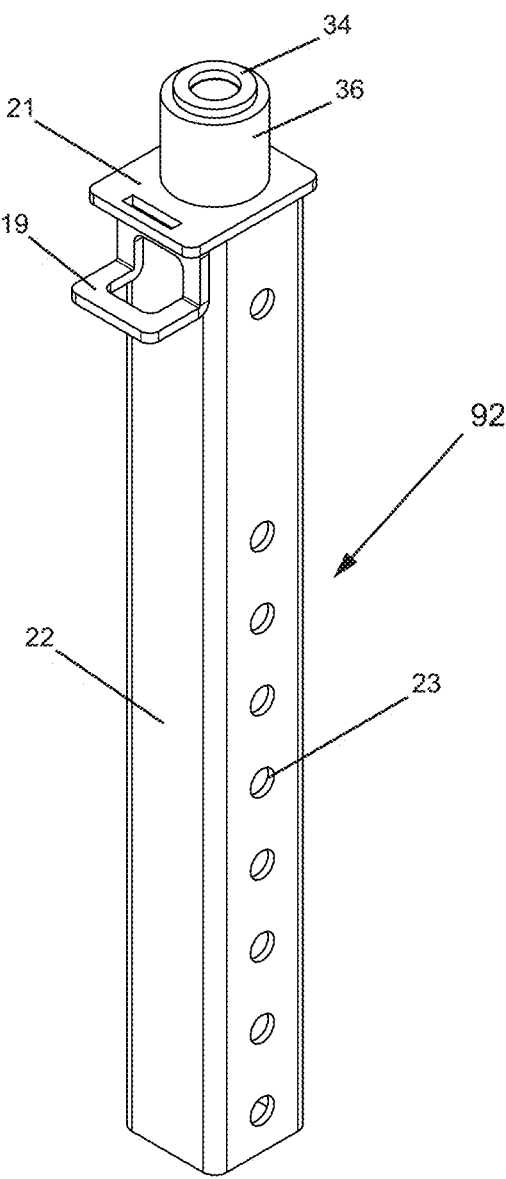
FIG. 20B is a perspective view of part of the vertical body assembly of the first apparatus.

FIG. 20B is a perspective view of the vertical body assembly 92 of the first apparatus 1. The swivel lock bar (includes 18 and 20, shown in FIG. 6) may also be described as being part of the vertical body assembly 92, although the swivel lock bar (includes 18 and 20) is not shown in FIGS. 20A and 20B. FIG. 20A is a cross sectional view of the vertical body assembly 92 (without the swivel lock bar, which includes 18 and 20, and which is shown in FIG. 6.

Figure 21:
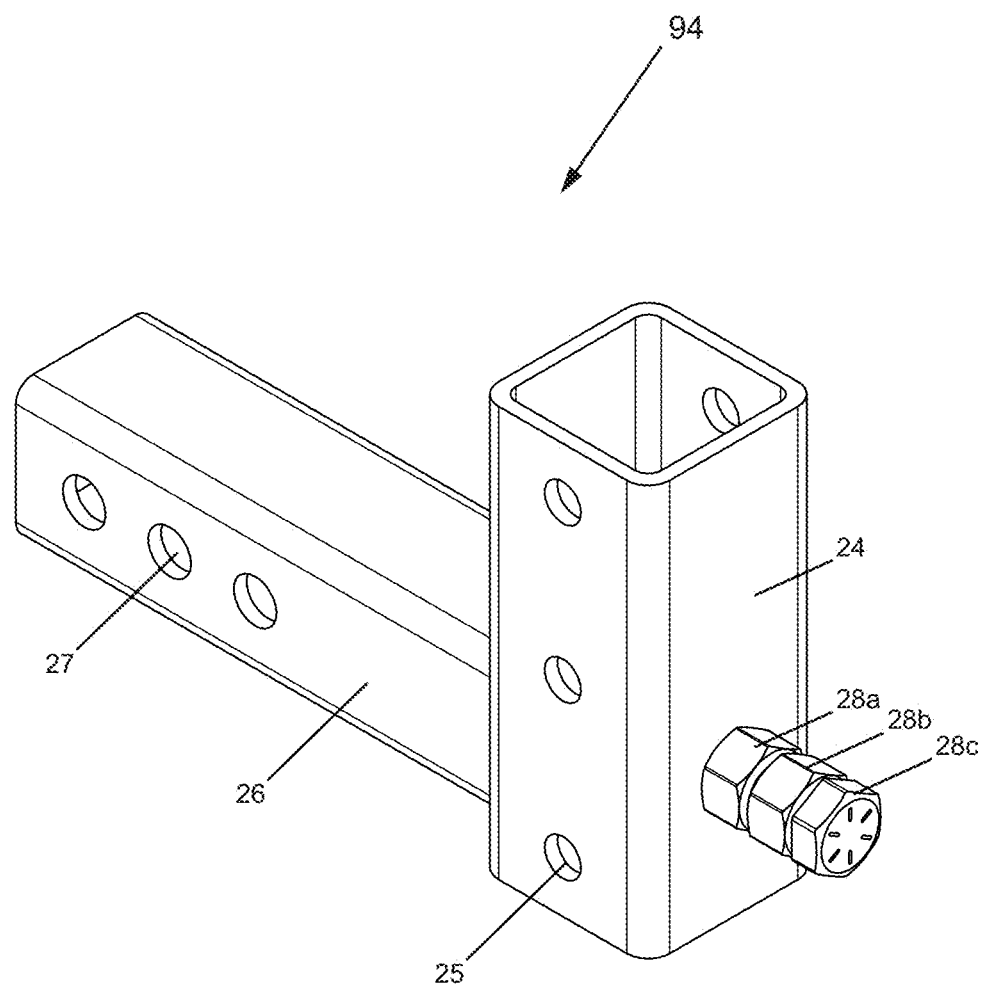
FIG. 21 is a perspective view a hitch receiver adapter of the first apparatus.

FIG. 21 is a perspective close up view of the hitch receiver adapter 94 of the first apparatus 1.

In reference to FIG. 2, fixed at the bottom of the cradle clamp base 7 is a shaft 30. The shaft 30 is inserted through the shaft housing 36 that is fixed atop the adjustable vertical tube 22 of the vertical body assembly 92 and is secured to the shaft 30 with a shaft pin 32, through an opening 30a (see FIG. 19, and FIG. 2). The shaft housing 36 includes bushing inserts 34 with the lower half portion of the shaft housing 36 recessed into the adjustable vertical tube 22. This shaft housing assembly 98 in the expanded view of FIG. 2, shaft 30 is shown before device 1 is assembled to vertical body assembly 92 (shaft 30 inserts through bushings 34 and is seated into shaft housing 36) permits the cradle clamp head assembly 90 of the first apparatus or hitch device 1 to rotate in a circular fashion relative to the adjustable vertical tube 22 and provides a stable yaw movement relative to the power tow vehicle 300.

The cradle clamp head assembly 90 is located atop the vertical body assembly 92 as shown in FIG. 2. The cradle clamp head assembly 90 is utilized to retain in position the member or bar 102 that is attached to the handle bars 202 and 208 of the wheelbarrow 200 as shown in FIG. 16. The height of the cradle clamp head assembly 90, with respect to vertical tube 22 is configured to be adjusted to receive bar 102 at the proper height based on the equipment to be attached. For example, the height for a wheelbarrow is set to allow enough ground clearance of the foot stand 230 when towing (shown in FIG. 1), while a push blower having three wheels requires a proper height that maintains its forward wheel slightly off the ground when towing.

With the cradle clamp head assembly 90 in an open position, as shown in FIG. 13 where the pivot arms 8 and 10 are rotated off the cradle base 7 and supported at a ninety degree angle by the cradle arm stops 3 and 5. The cradle arm stops 3 and 5 cannot be seen in FIG. 13, but their locations are shown in FIG. 3. The lever rod handle 16 in the "horizontal" and "inward pointing" position as shown in FIG. 13 with the lever rod notch pin 4 (shown in FIG. 8) seated in the deep notch 4a on the pull handle 9 having no spring 11 tension, and the bar 102 attached to the wheelbarrow 200 is placed on the pivot arms 8 and 10, so that the bar 102 is in contact with members 10a and 8a and may or may not come in contact with 10b and/or 8b at this time. The pull handle 9 is lifted up, rotating the pivot arm 8 and 10 about pivot member 51. The pivot tube 52 is fixed to the pivot arms 8 and 10 which is fixed to the pull handle 9, therefore, that whole assembly (52, 8, 10 and 9) is rotating about the pivot member or rod 51 which runs through the length of pivot tube 52. This action slides the bar 102 attached to the wheelbarrow 200 all the way into the junctions where members 10a and 10b come together and where members 8a and 8b come together on the pivot arms 8 and 10, self-aligning the bar 102 against the back of the pivot arms 8 and 10 as shown in FIG. 14. As the pivot arms 8 and 10 continue to rotate closed, the bar 102 falls onto the cradle base 7, and the bar 102 is placed into position between the stop tabs 6 and 12 and the back of the pivot arms 8 and 10 as shown in FIG. 15 (the bar 102 attached to the wheelbarrow 200 can be placed directly to this position on cradle base 7 prior to lifting up pull handle 9, however, it requires more time and accuracy in placement to align bar 102 with stop tabs 6 and 12 along with more effort to lift loaded wheelbarrow 200 higher and to hold in place until pull handle 9 can be rotated into position as shown in FIG. 15). The lever rod end 2a is now in line with the lock rod hole 14a of the member 14. To lock cradle clamp head assembly 90, the lever rod handle 16 is pressed in, causing the compressing of the spring 11 as the member 2 slides, within the tube or pull handle 9. This also causes the lever rod notch pin 4 to be moved out of the deep notch 4a while at the same time causing the lever rod end 2a to pass into and through the lock rod hole 14a of member 14. Next lever rod handle 16 is rotated up ninety degrees from orientation of FIG. 15 to orientation of FIG. 16. In the up position of the lever handle 16 in FIG. 16, the lever rod notch pin 4 will rest against the shallow notch 4b located at the end of pull handle 9, as shown in FIG. 16, held in place with tension from the compressed spring 11, preventing the cradle clamp head assembly 90 from opening. The second apparatus or attachment key bar 100 is locked-in and secured to the first apparatus or hitch device 1 as shown in FIG. 16. For towing equipment for long durations, the lever rod handle 16 is configured to be rotated down one hundred eighty (180.0) degrees to a more secure position (shown in FIG. 17).

The space between the pivot arms 8 and 10 and the stop tabs 6 and 12, respectively, allows the bar 102 up and down rotation (pitch) of the wheelbarrow 200 relative to the powered tow vehicle 300. The shaft 30 fixed to the bottom of the cradle clamp base 7 along with the shaft housing 36 and bushings 34 enables side-to-side rotation over three hundred and sixty degrees and provides a stable yaw movement relative to the mower.

A swivel lock mechanism 96 (FIG. 6) assembly includes: a swivel lock bar (includes members 18 and 20), an upper lock bar guide 17, a center lock bar guide 21 and a lower lock bar guide 19, may be provided to prevent yaw rotation of the cradle clamp head assembly 90 with respect to the vertical body assembly 92 when towing equipment already equipped with articulation movement or when no left to right rotation is desired. The swivel lock bar (includes members 18 and 20) is placed through the top opening of the upper lock bar guide 17 and continues through both the center lock bar guide 21 and a lower lock bar guide 19 (shown in FIG. 6). The swivel lock mechanism 96, shown in FIG. 6, would typically not be used to tow a traditional wheelbarrow 200 (FIG. 18) since there are no other points of articulation on the wheelbarrow 200 (FIG. 1).

At this point, the wheelbarrow 200 is attached to the power tow vehicle 300 and can be towed around a property while carrying its load, as shown in FIG. 1. Furthermore, while being towed, up and down motion (pitch) of the wheelbarrow 200 relative to the power tow vehicle 300 is permitted by the rotational movement of the bar 102 as the bar 102 is retained and locked-in the cradle clamp head assembly 90, as shown by FIGS. 16 and 17. Moreover, left and right rotational motion of the wheelbarrow 200 relative to the power tow vehicle 300 is permitted by rotational movement of the cradle clamp head assembly 90.

FIG. 1 shows a single wheeled wheelbarrow 200 attached to a powered tow vehicle 300 using the first apparatus or hitch device 1 and the second apparatus or attachment key bar 100, in accordance with at least one embodiment of the present invention. It will be understood that the powered tow vehicle 300 includes a receiver 302 for a hitch attachment, which is standard in the prior art and consists essentially of a tube with a generally square cross section or U-shaped, for receiving a hitch receiver adapter, or for attaching tools, racks, carts, etc.

Figure 8:
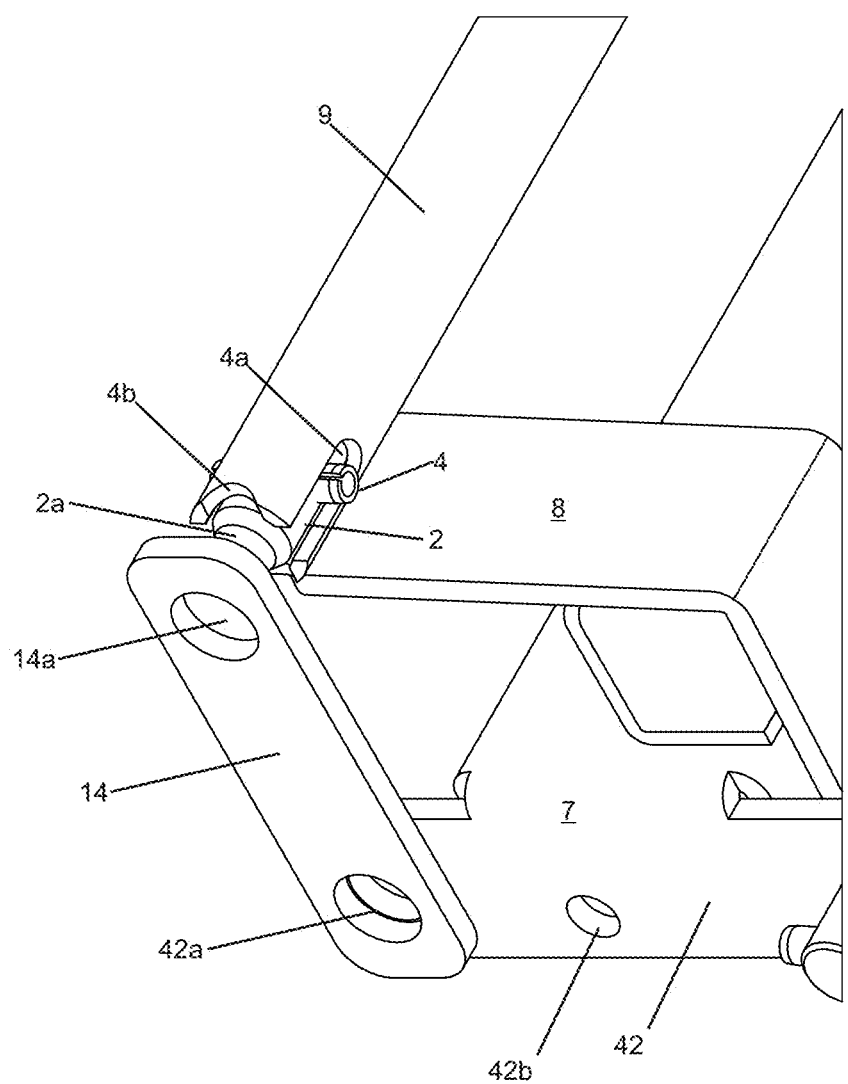
FIG. 8 is a perspective close up view of the lever rod notch pin 4 of the first apparatus in the release position.

When a user is ready to detach the wheelbarrow 200 from the power tow vehicle 300 shown in FIG. 1, the user simply rotates the lever rod handle 16, and integrated member 2, with tube 9, from the straight "up" position (FIG. 16) or straight down position (FIG. 17), to a "horizontal" position and pointing outwards as shown in FIG. 15. This action rotates the lever rod notch pin 4, to ninety degrees and out of the shallow notch 4b (FIG. 7) and in line with the deep notch 4a at the lever rod end 2. The spring 11 releases its tension as the lever rod notch pin 4 slips into the deep notch 4a. The lever rod notch pin 4 retracts out of the rod lock hole 14a, as shown in FIG. 8. The second apparatus or attachment key bar 100 with equipment is no longer locked-in to the cradle clamp head assembly 90 even though the cradle clamp head assembly 90 is still in the closed position as shown in FIG. 15. The cradle clamp head assembly 90 will open by the user's action of either driving the powered tow vehicle 300 forward or lifting the handles or members 206 and 212 of the wheelbarrow 200 and walking away from the first apparatus or hitch device 1, thereby detaching the wheelbarrow 200 from the power tow vehicle 300. The pivot arms 8 and 10 will rotate up and downwards stopping at a ninety degree angle at the cradle arm stops 3 and 5. This action typically happens instantaneously. The cradle clamp head assembly 90 remains in the fully opened position as shown in FIG. 13, ready to reattach the next piece of equipment.

It will be recognized that the attachment of the wheelbarrow 200 to the power tow vehicle 300 can be done quickly and without the need for tools or removal of any pins or clips. Likewise, it will be recognized that the detachment of the wheelbarrow 200 to the mower 300 can be done quickly and without the need for tools or removal of any pins or clips. In addition, multiple wheelbarrows can be permanently equipped with the second apparatus or attachment key bar 100 assembly or bar 102 as shown in FIG. 12, so that power tow vehicle equipped with a device or devices, in at least one embodiment, of the present invention can be utilized to tow multiple different wheelbarrows or other equipment.

Figure 10:
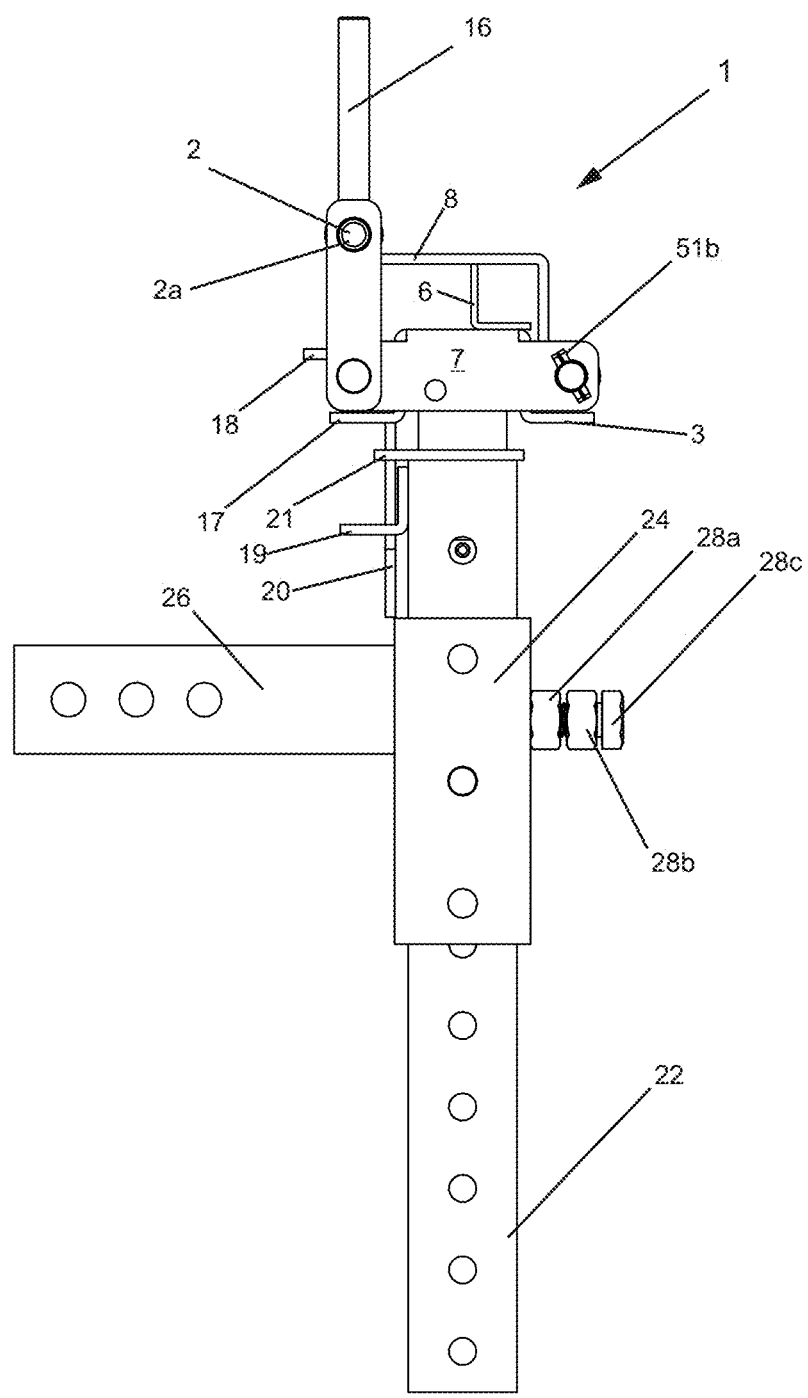
FIG. 10 is a left side view of the first apparatus in a tenth state.
Figure 11:
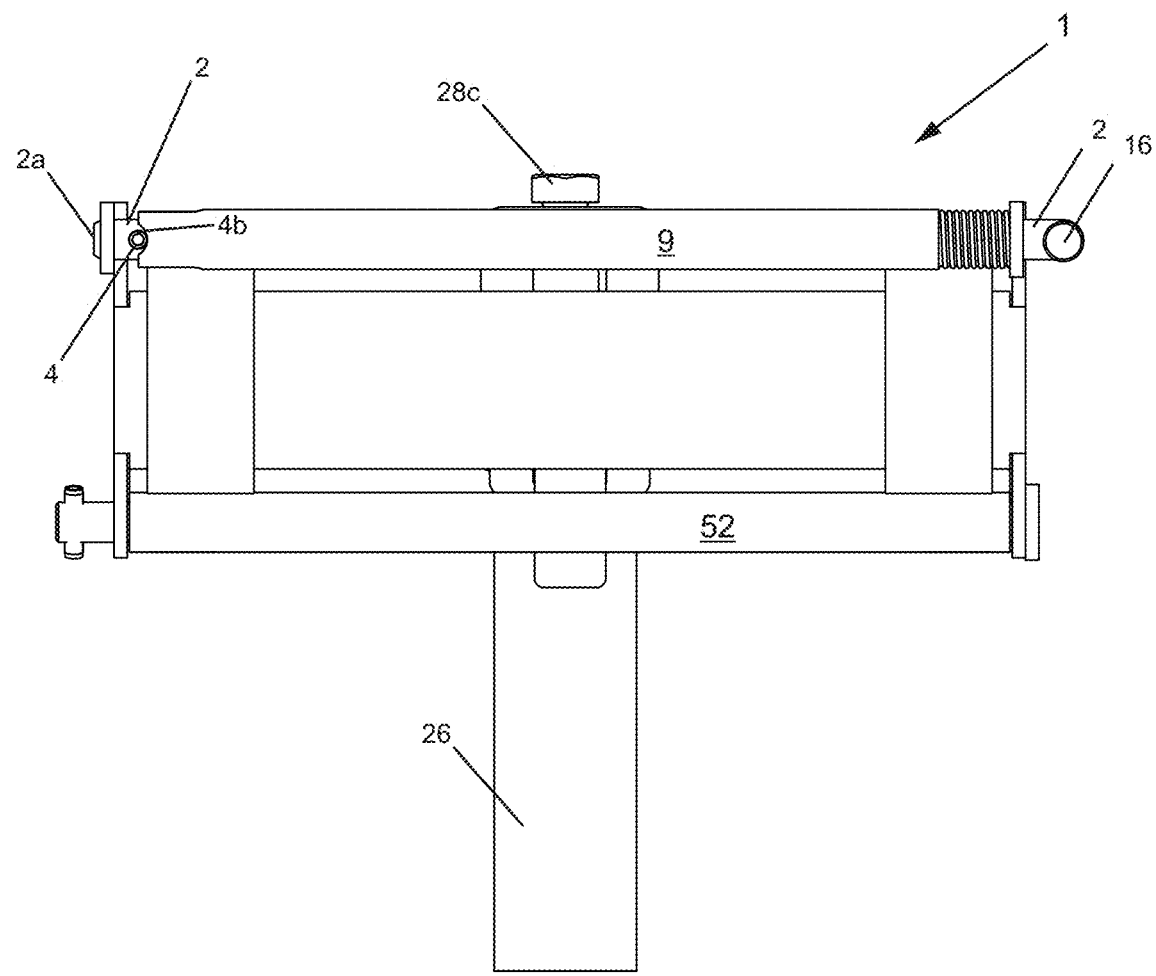
FIG. 11 is a top view of the first apparatus in an eleventh state.

To remove first apparatus or hitch device 1 from tow vehicle 300, detach towed equipment completely from first apparatus or hitch device 1. Loosen the jam nut 28b away from the fixed nut 28a then loosen the anti-rattle set bolt 28c, as shown in FIG. 10. Next remove the clip or clips 68 and hitch pin 64 from member 26 side of the ninety degree collar 24. The first apparatus or hitch device 1 can now be stored for future use on a trailer wall, taking up little space.

Figure 4:
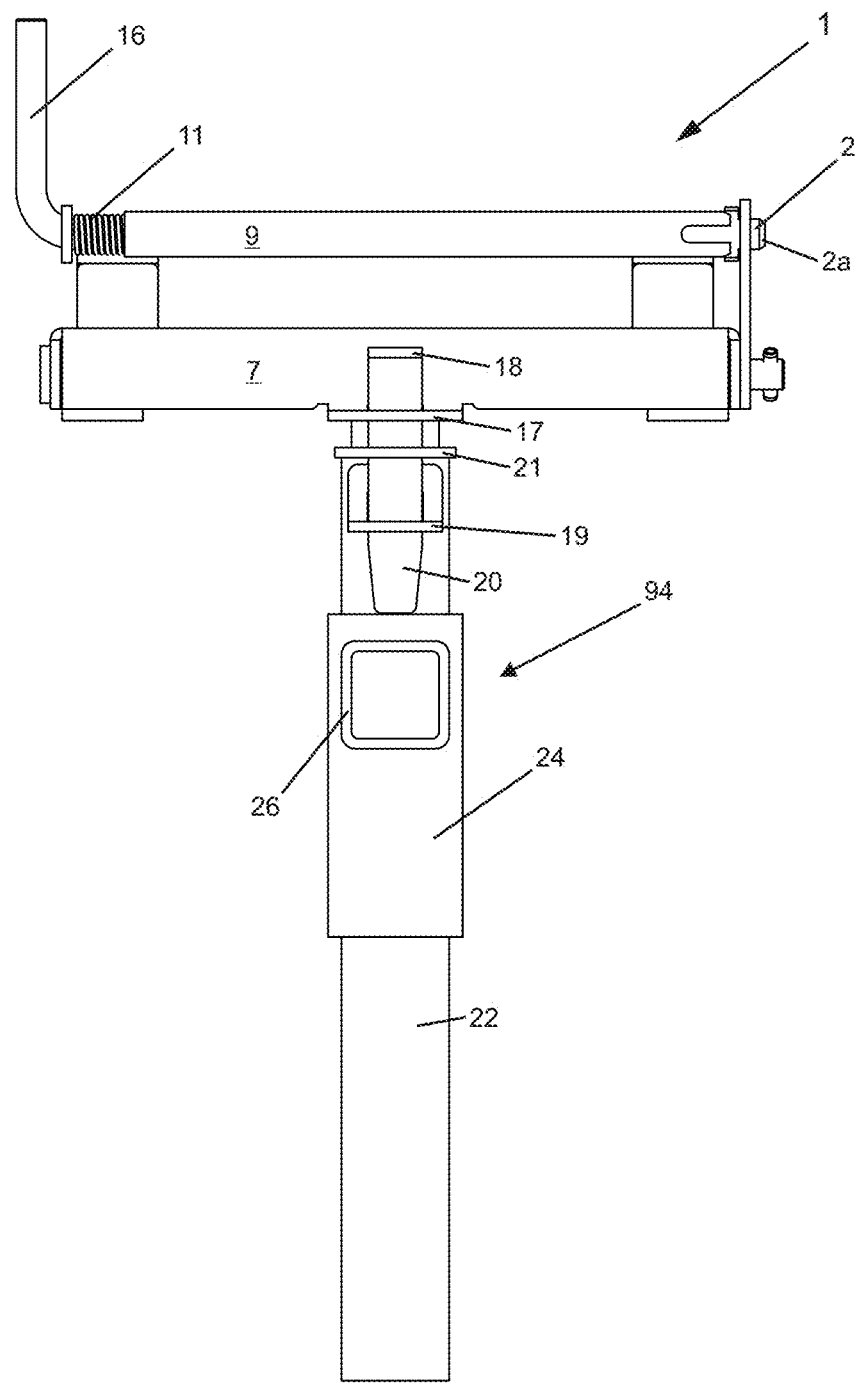
FIG. 4 is a front view of the first apparatus 1 shown in a third state; hitch receiver adapter 94 inverted and raised to maximum height adjustment to align with a tow vehicle hitch.

The cradle clamp head assembly 90 is configured to be rotated one hundred and eighty degrees (as shown in FIG. 4 and FIG. 5 to utilize the accessory holes 40a and 42a shown in FIG. 6. The pivot arms 8 and 10 shown in FIG. 2, can function as a locking mechanism whether cradle clamp head assembly 90 is facing forward or backwards relative to the power tow vehicle 300 when towing, as shown in FIG. 5. The areas on either side of stop tabs 6 and 12 on the cradle base 7 (FIG. 13) can be utilized to hold and lock-in bar 102 (FIG. 17) which will allow for equipment adapters and other add-on apparatuses. Bar 102 may be or may be replaced by various lengths of rods, pipes, tubes and bars with cross sections of round, square, solid, hollow, C-shaped, U-shaped, H-shaped, L-shaped, T-shaped, I-shaped or any combination made of various materials comprising of steel, aluminum, plastic, PVC, polymer and fiberglass.

The adjustable vertical tube 22 and the incremental adjustment holes 23 can integrate customized equipment adapters and also the many available receiver adapters and hitch accessories on the market to carry and/or tow many other various types of equipment and tools. An alternate pivot rod 51 can be used to insert into the accessory holes 40a and 42a that can integrate customized equipment adapters. Equipment adapters may be used for attaching tools such as those with special handles such as D-shaped, T-shaped handles, specialty carts and sleds of various materials and/or for attaching hooks, hanging bags, water container holders or small tool carriers to name a few.

Equipment included are those with special handles such as D-shaped, T-shaped handles, specialty carts and sleds of various materials.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a first apparatus comprised of:
      a cradle clamp head assembly;
      a vertical body assembly having a first end and an opposing second end, the cradle clamp head assembly configured to be attached to the vertical body assembly closer to the first end of the vertical body assembly than the second end of the vertical body assembly; and
      a hitch receiver adapter configured to be attached to the vertical body assembly, while the cradle clamp head assembly is attached to the vertical body assembly, such that the hitch receiver adapter is further from the first end of the vertical body assembly than the cradle clamp head assembly;
   a second apparatus comprised of:
      a first bar having a first end and a second end opposite the first end; and
      an first attachment device configured to attach the first bar to a wheelbarrow;
   and wherein the first apparatus is configured to be removably attached to the second apparatus to removably attach the wheelbarrow to a power tow vehicle through the second apparatus and the first apparatus.

2. The apparatus of claim 1 wherein
   the cradle clamp head assembly is configured to rotate with respect to the vertical body assembly.

3. The apparatus of claim 1 further comprising
   a swivel lock bar; and
   wherein the cradle clamp head assembly is configured to rotate with respect to the vertical body assembly, when the swivel lock bar is in an unlocked state; and
   wherein the cradle clamp head assembly is not configured to substantially rotate with respect to the vertical body assembly, when the swivel lock bar is in a locked state.

4. The apparatus of claim 1 wherein
   the hitch receiver adapter is configured to removably attach to a hitch receiver of the power tow vehicle.

5. The apparatus of claim 1 wherein
   the hitch receiver adapter is configured to be attached to the vertical body assembly at different locations, with respect to the vertical body assembly.

6. The apparatus of claim 1 wherein
   the cradle clamp head assembly includes:
      a pull handle;
      a first pivot arm; and
   wherein the first bar of the second apparatus is configured to be attached to the first apparatus by moving the pull handle to cause the first and second pivot arms to simultaneously pivot.

7. The apparatus of claim 6 wherein
   the cradle clamp head assembly further includes:
      a cradle base;
      a first stop tab; and
      a second stop tab; and
   wherein the first bar of the second apparatus is configured to be attached to the first apparatus by moving the pull handle to cause the first and second pivot arms to simultaneously pivot until the first bar of the second apparatus is on the cradle base, and between the first and second stop tabs and the first and second pivot arms.

8. The apparatus of claim 7 wherein
   when the first bar of the second apparatus is on the cradle base and between the first and second stop tabs and the first and second pivot arms, a first end of the pull handle is configured to slide into a lock rod hole of a plate to lock the first bar of the second apparatus to the first apparatus.

9. The apparatus of claim 8 wherein
   when the first bar of the second apparatus is on the cradle base and between the first and second stop tabs and the first and second pivot arms, a lever rod handle connected to the pull handle is configured to rotate the pull handle until the pull handle is locked in a state in which the first end of the pull handle is held in the lock rod hole of the plate.

10. A method comprising:
    attaching a first apparatus to a hitch receiver which is connected to a power tow vehicle;
    attaching the first apparatus to a second apparatus which is connected to a wheelbarrow;
    wherein the first apparatus is comprised of:
       a cradle clamp head assembly;
       a vertical body assembly having a first end and an opposing second end, the cradle clamp head assembly configured to be attached to the vertical body assembly closer to the first end of the vertical body assembly than the second end of the vertical body assembly; and a hitch receiver adapter configured to be attached to the vertical body assembly, while the cradle clamp head assembly is attached to the vertical body assembly, such that the hitch receiver adapter is further from the first end of the vertical body assembly than the cradle clamp head assembly;

and wherein the second apparatus is comprised of:

a first bar having a first end and a second end opposite the first end; and an first attachment device configured to attach the first bar to a wheelbarrow.

11. The method of claim 10 wherein the cradle clamp head assembly is configured to rotate with respect to the vertical body assembly.

12. The method of claim 10 wherein the first apparatus is further comprised of:

a swivel lock bar; and wherein the cradle clamp head assembly is configured to rotate with respect to the vertical body assembly, when the swivel lock bar is in an unlocked state; and wherein the cradle clamp head assembly is not configured to substantially rotate with respect to the vertical body assembly, when the swivel lock bar is in a locked state.

13. The method of claim 10 wherein the hitch receiver adapter is configured to removably attach to a hitch receiver of the power tow vehicle.

14. The method of claim 10 wherein the hitch receiver adapter is configured to be attached to the vertical body assembly at different locations, with respect to the vertical body assembly.

15. The method of claim 10 wherein the cradle clamp head assembly includes:

a pull handle;

a first pivot arm; and wherein the first bar of the second apparatus is configured to be attached to the first apparatus by moving the pull handle to cause the first and second pivot arms to simultaneously pivot.

16. The method of claim 15 wherein the cradle clamp head assembly further includes:

a cradle base;

a first stop tab; and a second stop tab; and wherein the first bar of the second apparatus is configured to be attached to the first apparatus by moving the pull handle to cause the first and second pivot arms to simultaneously pivot until the first bar of the second apparatus is on the cradle base, and between the first and second stop tabs and the first and second pivot arms.

17. The method of claim 16 wherein when the first bar of the second apparatus is on the cradle base and between the first and second stop tabs and the first and second pivot arms, a first end of the pull handle is configured to slide into a lock rod hole of a plate to lock the first bar of the second apparatus to the first apparatus.

18. The method of claim 16 wherein when the first bar of the second apparatus is on the cradle base and between the first and second stop tabs and the first and second pivot arms, a lever rod handle connected to the pull handle is configured to rotate the pull handle until the pull handle is locked in a state in which the first end of the pull handle is held in the lock rod hole of the plate.

* * * * *